(12) United States Patent
Lai

(10) Patent No.: US 12,725,327 B2
(45) Date of Patent: Sep. 1, 2026

(54) USER DRAWN ZONE FOR MARINE ELECTRONIC DEVICES

(71) Applicant: Navico, Inc., Tulsa, OK (US)

(72) Inventor: Aska Hiu Mei Lai, Auckland (NZ)

(73) Assignee: Navico, Inc., Tulsa, OK (US)

( * ) Notice: Subject to any disclaimer, the term of this patent is extended or adjusted under 35 U.S.C. 154(b) by 228 days.

(21) Appl. No.: 18/530,994

(22) Filed: Dec. 6, 2023

(65) Prior Publication Data

US 2025/0191256 A1 Jun. 12, 2025

(51) Int. Cl.
*G06T 11/26* (2026.01)
*G01S 13/86* (2006.01)
*G06T 7/20* (2017.01)
*G06T 7/70* (2017.01)

(52) U.S. Cl.
CPC ............ *G06T 11/26* (2026.01); *G01S 13/862* (2013.01); *G06T 7/20* (2013.01); *G06T 7/70* (2017.01); *G06T 2207/20104* (2013.01)

(58) Field of Classification Search
None
See application file for complete search history.

(56) References Cited

U.S. PATENT DOCUMENTS

| | | | |
|---|---|---|---|
| 4,614,900 | A | 9/1986 | Young |
| 4,824,408 | A | 4/1989 | Aertker et al. |
| 4,829,493 | A | 5/1989 | Bailey |
| 4,879,697 | A | 11/1989 | Lowrance et al. |
| 4,888,699 | A | 12/1989 | Knoll et al. |
| 5,025,423 | A | 6/1991 | Earp |
| 5,172,324 | A | 12/1992 | Knight |
| 5,191,341 | A | 3/1993 | Gouard et al. |
| 5,202,835 | A | 4/1993 | Knight |
| 5,268,844 | A | 12/1993 | Carver et al. |
| 5,386,368 | A | 1/1995 | Knight |

(Continued)

FOREIGN PATENT DOCUMENTS

| | | |
|---|---|---|
| EP | 1033584 A2 | 9/2000 |
| EP | 1772789 | 4/2007 |

OTHER PUBLICATIONS

PCT International Search Report and Written Opinion; PCT/IB2013/060285; Feb. 18, 2014.

(Continued)

*Primary Examiner* — Jeffrey J Chow
(74) *Attorney, Agent, or Firm* — Nelson Mullins Riley & Scarborough LLP

(57) ABSTRACT

Example devices, systems and methods are provided for operating a marine electronic device for a watercraft to determine a drawn zone based on a user input. Some example systems include a user interface comprising a touch screen, a processor and a memory having computer program code stored thereon. The marine electronic device is configured to cause one of a chart, a sonar image, or a radar image to be displayed on the touch screen and to receive, via the touch screen, a user input defining a continuous touch pattern directed to the one of the chart, the sonar image, or the radar image. The marine electronic device is further configured to determine, based on the user input, a drawn zone of the one of the chart, the sonar image, or the radar image and determine a drawn zone functionality associated with the user input.

21 Claims, 18 Drawing Sheets

(56) References Cited

U.S. PATENT DOCUMENTS 5,491,636 A 2/1996 Robertson et al.
5,523,951 A 6/1996 Kriegsman et al.
5,537,380 A 7/1996 Sprankle, Jr. et al.
5,606,930 A 3/1997 LeBlanc et al.
5,646,856 A 7/1997 Kaesser
5,754,430 A 5/1998 Sawada
5,832,440 A 11/1998 Woodbridge et al.
5,859,517 A 1/1999 DePasqua
5,884,213 A 3/1999 Carlson
6,225,984 B1 5/2001 Crawford
6,266,611 B1 7/2001 Matsubayashi
6,321,158 B1 11/2001 DeLorme et al.
6,411,283 B1 6/2002 Murphy
6,418,080 B2 7/2002 Inouchi
6,421,299 B1 7/2002 Betts et al.
6,633,810 B1 10/2003 Qureshi et al.
6,761,692 B2 7/2004 Angelsen et al.
6,816,782 B1 11/2004 Walters et al.
6,904,341 B2 6/2005 Kish et al.
7,002,579 B2 2/2006 Olson
7,236,426 B2 6/2007 Turner et al.
7,268,703 B1 9/2007 Kabel et al.
7,430,461 B1 9/2008 Michaels
7,652,952 B2 1/2010 Betts et al.
7,710,825 B2 5/2010 Betts et al.
7,729,203 B2 6/2010 Betts et al.
7,755,974 B2 7/2010 Betts et al.
7,812,667 B2 10/2010 Fagg
7,870,496 B1 1/2011 Sherwani
7,890,867 B1 2/2011 Margulis
8,019,532 B2 9/2011 Sheha et al.
8,063,540 B2 11/2011 Angelsen et al.
8,380,366 B1 2/2013 Schulte et al.
10,460,484 B2 10/2019 Hovland et al.
2002/0035574 A1 3/2002 Dumas
2002/0093541 A1 7/2002 Schileru-Key
2002/0177944 A1 11/2002 Ihara et al.
2004/0181337 A1 9/2004 Kawasaki et al.
2004/0193364 A1 9/2004 Chojnacki
2005/0102101 A1 5/2005 Beesley et al.
2006/0013066 A1 1/2006 Nishimori et al.
2006/0089794 A1 4/2006 DePasqua
2006/0119585 A1 6/2006 Skinner
2006/0224940 A1 10/2006 Lee
2007/0162207 A1 7/2007 Shimo et al.
2008/0126935 A1 5/2008 Blomgren
2008/0133131 A1 6/2008 Poreda
2008/0204424 A1 8/2008 Jin et al.
2009/0064055 A1 3/2009 Chaudhri et al.
2009/0099871 A1 4/2009 Gadodia
2009/0140909 A1* 6/2009 Wood .................... G01S 13/726 342/27
2009/0179789 A1 7/2009 Haughay, Jr. et al.
2009/0249247 A1 10/2009 Tseng et al.
2009/0251366 A1 10/2009 McClure et al.
2009/0287409 A1 11/2009 Summers
2010/0080082 A1 4/2010 Betts et al.
2010/0094548 A1 4/2010 Tadman et al.
2010/0131133 A1 5/2010 Koda et al.
2010/0145601 A1 6/2010 Kurtti et al.
2010/0199225 A1 8/2010 Coleman et al.
2010/0226203 A1 9/2010 Buttle et al.
2010/0250122 A1 9/2010 Kubota et al.
2011/0013484 A1 1/2011 Coleman et al.
2011/0013485 A1 1/2011 Maguire
2011/0019887 A1 1/2011 Roehrig et al.
2011/0025720 A1 2/2011 Jo et al.
2011/0029238 A1 2/2011 Lee et al.
2011/0154183 A1 6/2011 Burns et al.
2012/0001773 A1 1/2012 Lyons et al.
2012/0011437 A1 1/2012 James et al.
2012/0014220 A1 1/2012 DePasqua
2012/0069712 A1 3/2012 Potanin et al.
2012/0106300 A1 5/2012 Maguire
2012/0185801 A1 7/2012 Madonna et al.
2012/0290200 A1 11/2012 Kabel et al.
2013/0007665 A1 1/2013 Chaudhri et al.
2014/0200806 A1 7/2014 Carnevali
2015/0051836 A1 2/2015 Langford-Wood
2016/0091324 A1 3/2016 Horihata et al.
2016/0101838 A1 4/2016 Kojima
2016/0123756 A1 5/2016 Becker et al.
2018/0350144 A1* 12/2018 Rathod .............. G06Q 20/3224
2022/0268585 A1* 8/2022 Tulgara ................... G01S 15/89
2023/0316928 A1* 10/2023 Amma ..................... G08G 3/00 701/117

OTHER PUBLICATIONS

PCT International Search Report and Written Opinion; PCT/US2013/047869; Oct. 21, 2013.
PCT International Search Report and Written Opinion; PCT/US2013/048177; Oct. 21, 2013.
PCT International Search Report and Written Opinion; PCT/US2013/048129; Oct. 17, 2013.
PCT International Search Report and Written Opinion; PCT/US2013/047926; Oct. 11, 2013.
PCT International Search Report and Written Opinion; PCT/US2013/047645; Sep. 27, 2013.
PCT International Search Report and Written Opinion; PCT/IB2014/063905; Jan. 30, 2015.
Voyages; Wessex Archeology; Jul. 5, 2008; http://www.wessexarch.co.uk/projects/marine/alsf/englands_shipping/data/voyages.html.
DKart Software Presentation; Morintech; 2004; http://www.ramona.se/us/downloads/dKart_Functions_2004.ppt.
Furuno NavPilot 711 Product Detail Website visited Aug. 18, 2016 http://www.furunousa.com/Products/ProductDetail.aspx?product=NAVPILOT+711.
“Chart Work—SAR Search Patterns.” Chart Work, OpenCPN, n.d. Web. Oct. 21, 2012 <http://web.archive.org/web/20121023053142/http://opencpn.org/ocpn/node/196>.

* cited by examiner

USER DRAWN ZONE FOR MARINE ELECTRONIC DEVICES

FIELD OF THE INVENTION

Embodiments of the present invention relate generally to marine electronic devices and, more particularly, to marine electronic devices, systems and associated methods for determining a drawn zone and operating based on corresponding functionality.

BACKGROUND OF THE INVENTION

Guard zones, or tracking zones, generate visual or audible alarms when targets enter or leave the operator-set zone. In general, these zones are manually entered using moveable arrows and the zone is adjusted by dragging selected corners or the outer perimeters of the zone. This process can be time consuming and frustrating, particularly when the desired guard zone shape is not a square.

Applicant has developed systems and methods detailed herein to efficiently improve and enhance the ability of users to safely and quickly generate guard zones.

BRIEF SUMMARY OF THE INVENTION

Example embodiments of the present disclosure provide systems and methods for operating a marine electronic device for a watercraft to determine a drawn zone based on a user input. In some embodiments, the user input on a touch screen may advantageously minimize the time it takes to generate a drawn zone and minimize the need for expertise in generating a drawn zone. In some embodiments, based on the user input on a chart, a sonar image, or a radar image, a system for operating the marine electronic device of the watercraft may determine a drawn zone from the user input and subsequently operate according to a drawn zone functionality. In some embodiments, the drawn zone functionality may be to provide a notification to the user when the watercraft leaves the drawn zone, when an object enters the drawn zone, and/or when a future sonar event corresponds to the sonar image that is currently presented within the drawn zone, although other functionality is also contemplated herein.

An example embodiment includes a marine electronic device for a watercraft, the marine electronic device including a user interface comprising a touch screen, a processor and a memory having computer program code stored thereon. The memory and the computer program code are configured to, with the processor, cause the marine electronic device to cause one of a chart, a sonar image, or a radar image to be displayed on the touch screen and receive, via the touch screen, a user input defining a continuous touch pattern directed to the one of the chart, the sonar image, or the radar image, wherein the touch pattern defines a starting point, an ending point, and a touched line across the touch screen between the starting point and the ending point and wherein the touched line defines an at least partially enclosed portion of the one of the chart, the sonar image, or the radar image. The memory and the computer program code are further configured to, with the processor, cause the marine electronic device to determine, based on the user input, a drawn zone of the one of the chart, the sonar image, or the radar image, wherein the drawn zone comprises an enclosed portion of the one of the chart, the sonar image, or the radar image that corresponds to the at least partially enclosed portion defined by the touched line. The memory and the computer program code are further configured to, with the processor, cause the marine electronic device to determine a drawn zone functionality associated with the user input, wherein the drawn zone functionality is at least one of: provide a notification when an object enters into the drawn zone, provide a notification when the watercraft leaves the drawn zone, or provide a notification upon future occurrence of a sonar event that corresponds to one or more characteristics of the sonar image that are currently present within the drawn zone and operate at least one of the marine electronic device or one or more other systems based on the determined drawn zone functionality.

In an example embodiment of the marine electronic device, the notification is one or more visual or audio notifications. In some example embodiments of the marine electronic device, the memory and the computer program code are further configured to cause the marine electronic device to generate the drawn zone by determining one or more positions on the one of the chart, the sonar image, or the radar image that each correspond to one or more points along the continuous touch pattern.

In an example embodiment of the marine electronic device, the drawn zone is determined to be a circle, a polygon, or other shape. In some example embodiments of the marine electronic device, the memory and the computer program code are further configured to, with the processor, cause the marine electronic device to cause presentation of the drawn zone on the touch screen, receive a second user input indicating a desired change to the drawn zone and update the drawn zone based on the second user input.

In some example embodiments of the marine electronic device, the memory and the computer program code are further configured to cause the marine electronic device to receive real-time environmental data based on a current location of the watercraft and determine, based on the received environmental data, an instance in which the object enters into the drawn zone and, in response thereto, provide the notification.

In an example embodiment of the marine electronic device, the memory and the computer program code are further configured to cause the marine electronic device to determine the one or more characteristics within the drawn zone of the sonar image currently presented, receive real-time sonar data and determine an instance in which received sonar data includes one or more characteristics that sufficiently match the determined one or more characteristics, and, in response thereto, provide the notification.

In some example embodiments of the marine electronic device, the memory and the computer program code are further configured to cause the marine electronic device to determine a current location of the watercraft and determine, based on the current location, an instance in which the watercraft leaves the drawn zone and, in response thereto, provide the notification.

In an example embodiment of the marine electronic device, the memory and the computer program code are further configured to cause the marine electronic device to determine one or more anchoring locations within the drawn zone.

In some example embodiments of the marine electronic device, the memory and the computer program code are further configured to, with the processor, cause the marine electronic device to cause presentation of the one or more anchoring locations within the drawn zone on the touch screen, receive user input selecting an anchoring location from among the one or more anchoring locations within the drawn zone and generate a route from the watercraft to the selected anchoring location.

In another example embodiment, a system for operating a marine electronic device for a watercraft is provided including a user interface comprising a touch screen, a processor and a memory having computer program code stored thereon. The memory and the computer program code configured to, with the processor, cause the marine electronic device to cause one of a chart, a sonar image, or a radar image to be displayed on the touch screen and receive, via the touch screen, a user input defining a continuous touch pattern directed to the one of the chart, the sonar image, or the radar image, wherein the touch pattern defines a starting point, an ending point, and a touched line across the touch screen between the starting point and the ending point and wherein the touched line defines an at least partially enclosed portion of the one of the chart, the sonar image, or the radar image. The memory and the computer program code are further configured to, with the processor, cause the marine electronic device to determine, based on the user input, a drawn zone of the one of the chart, the sonar image, or the radar image, wherein the drawn zone comprises an enclosed portion of the one of the chart, the sonar image, or the radar image that corresponds to the at least partially enclosed portion defined by the touched line. The memory and the computer program code are further configured to, with the processor, cause the marine electronic device to determine a drawn zone functionality associated with the user input, wherein the drawn zone functionality is at least one of: provide a notification when an object enters into the drawn zone, provide a notification when the watercraft leaves the drawn zone, or provide a notification upon future occurrence of a sonar event that corresponds to one or more characteristics of the sonar image that are currently present within the drawn zone and operate at least one of the marine electronic device or one or more other systems based on the determined drawn zone functionality.

In an example embodiment, the memory and the computer program code are further configured to cause the marine electronic device to generate the drawn zone by determining one or more positions on the one of the chart, the sonar image, or the radar image that each correspond to one or more points along the continuous touch pattern. In some example embodiments, the drawn zone is determined to be a circle, a polygon, or other shape.

In an example embodiment, the memory and the computer program code are further configured to, with the processor, cause the marine electronic device to cause presentation of the drawn zone on the touch screen, receive a second user input indicating a desired change to the drawn zone and update the drawn zone based on the second user input.

In some example embodiments, the memory and the computer program code are further configured to, with the processor, cause the marine electronic device to receive real-time environmental data based on a current location of the watercraft and determine, based on the received environmental data, an instance in which the object enters into the drawn zone and, in response thereto, provide the notification.

In an example embodiment, the memory and the computer program code are further configured to cause the marine electronic device to determine the one or more characteristics within the drawn zone of the sonar image currently presented, receive real-time sonar data and determine an instance in which received sonar data includes one or more characteristics that sufficiently match the determined one or more characteristics, and, in response thereto, provide the notification.

In some example embodiments, the memory and the computer program code are further configured to cause the marine electronic device to determine a current location of the watercraft and determine, based on the current location, an instance in which the watercraft leaves the drawn zone and, in response thereto, provide the notification.

In an example embodiment, the memory and the computer program code are further configured to cause the marine electronic device to determine one or more anchoring locations within the drawn zone.

In some example embodiments, the memory and the computer program code are further configured to, with the processor, cause the marine electronic device to cause presentation of the one or more anchoring locations within the drawn zone on the touch screen, receive user input selecting an anchoring location from among the one or more anchoring locations within the drawn zone and generate a route from the watercraft to the selected anchoring location.

In a further example embodiment, a method is provided for operating a marine electronic device for a watercraft including causing one of a chart, a sonar image, or a radar image to be displayed on the touch screen and receiving, via the touch screen, a user input defining a continuous touch pattern directed to the one of the chart, the sonar image, or the radar image, wherein the touch pattern defines a starting point, an ending point, and a touched line across the touch screen between the starting point and the ending point, wherein the touched line defines an at least partially enclosed portion of the one of the chart, the sonar image, or the radar image. The method also includes determining, based on the user input, a drawn zone of the one of the chart, the sonar image, or the radar image, wherein the drawn zone comprises an enclosed portion of the one of the chart, the sonar image, or the radar image that corresponds to the at least partially enclosed portion defined by the touched line. The method further includes determining a drawn zone functionality associated with the user input, wherein the drawn zone functionality is at least one of: provide a notification when an object enters into the drawn zone, provide a notification when the watercraft leaves the drawn zone, or provide a notification upon future occurrence of a sonar event that corresponds to one or more characteristics of the sonar image that are currently present within the drawn zone and operating at least one of the marine electronic device or one or more other systems based on the determined drawn zone functionality.

BRIEF DESCRIPTION OF THE DRAWINGS

Figure 1:
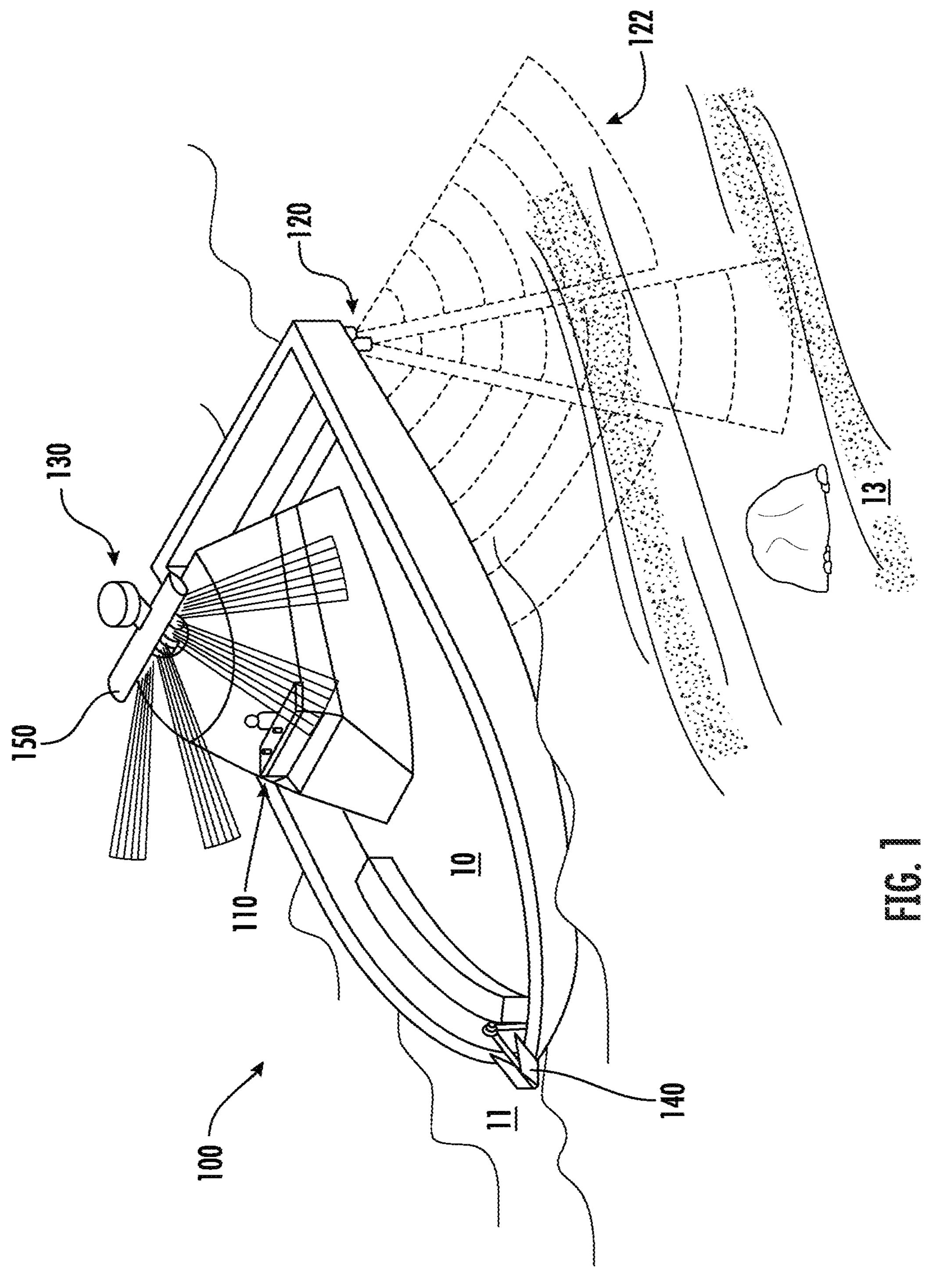
Figure 4A:
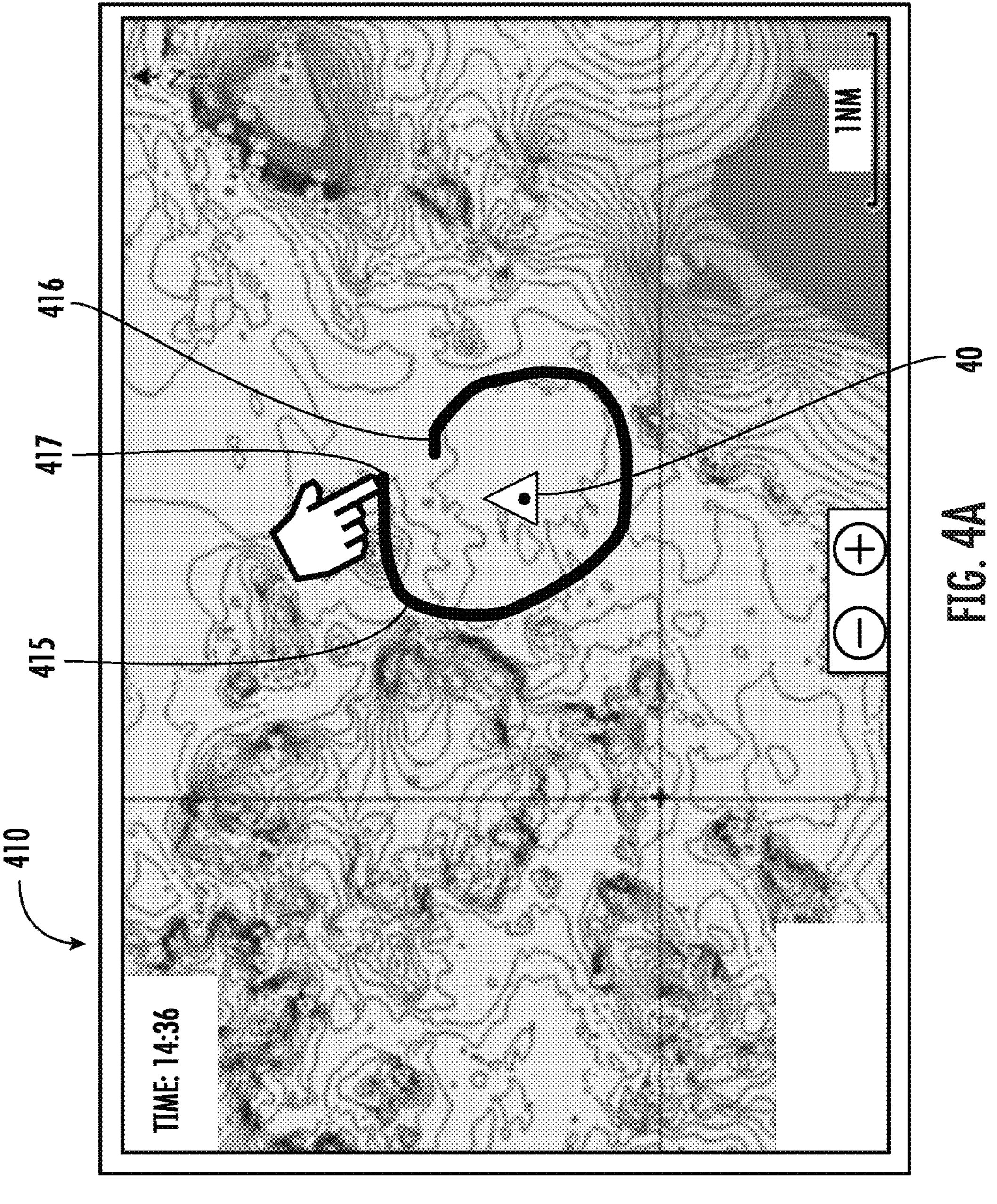
Figure 4B:
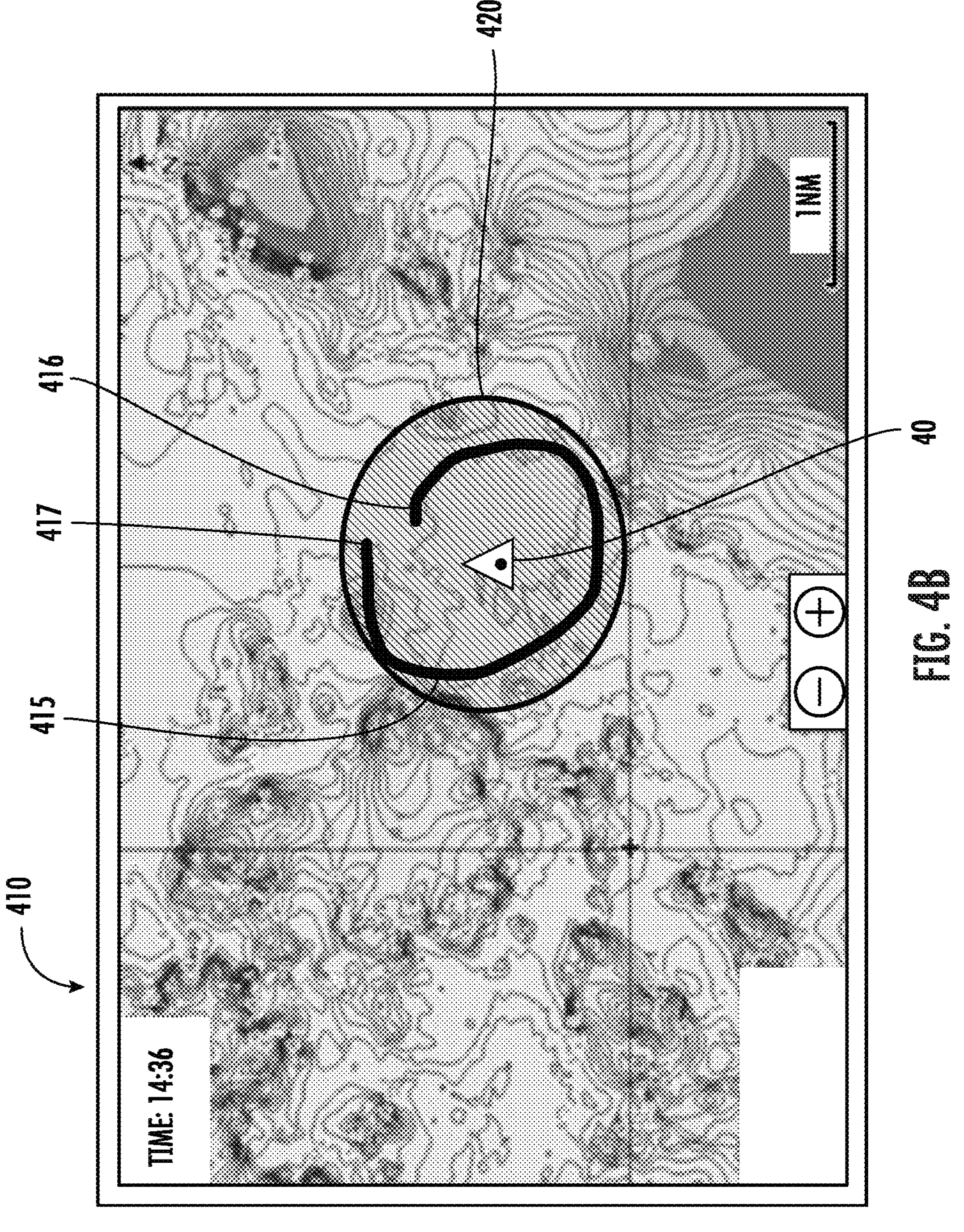
Figure 4C:
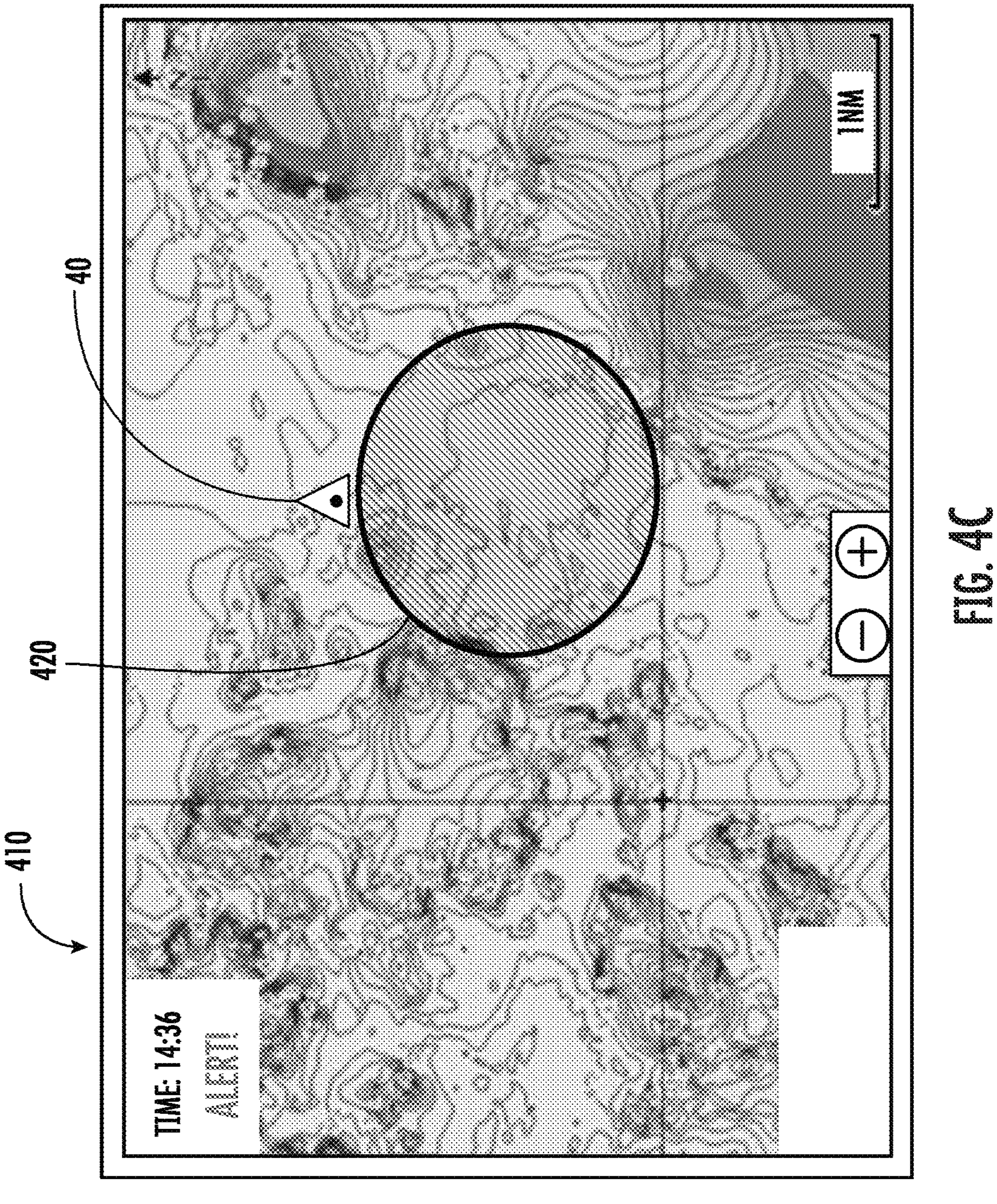
Figure 5A:
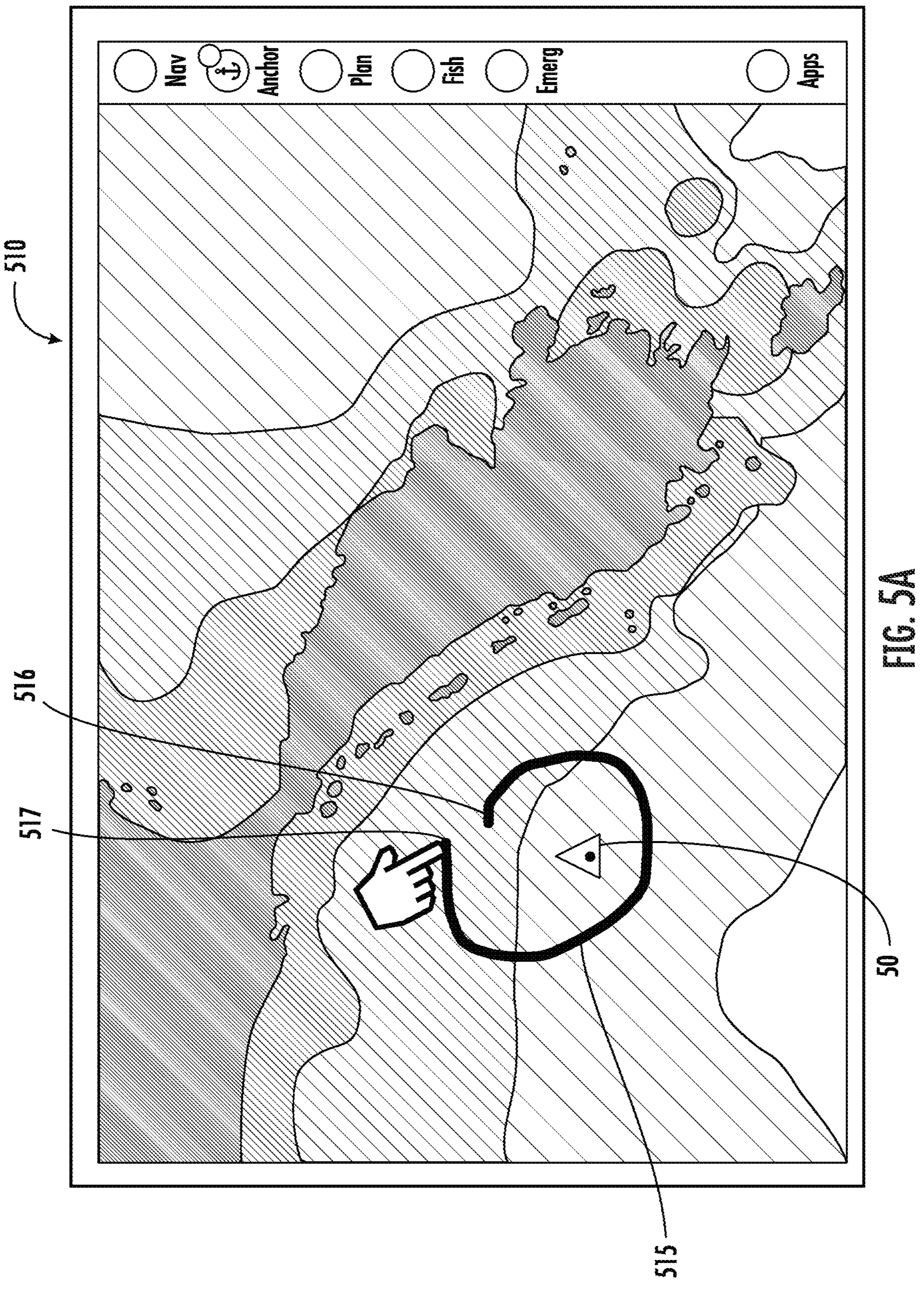
Figure 5B:
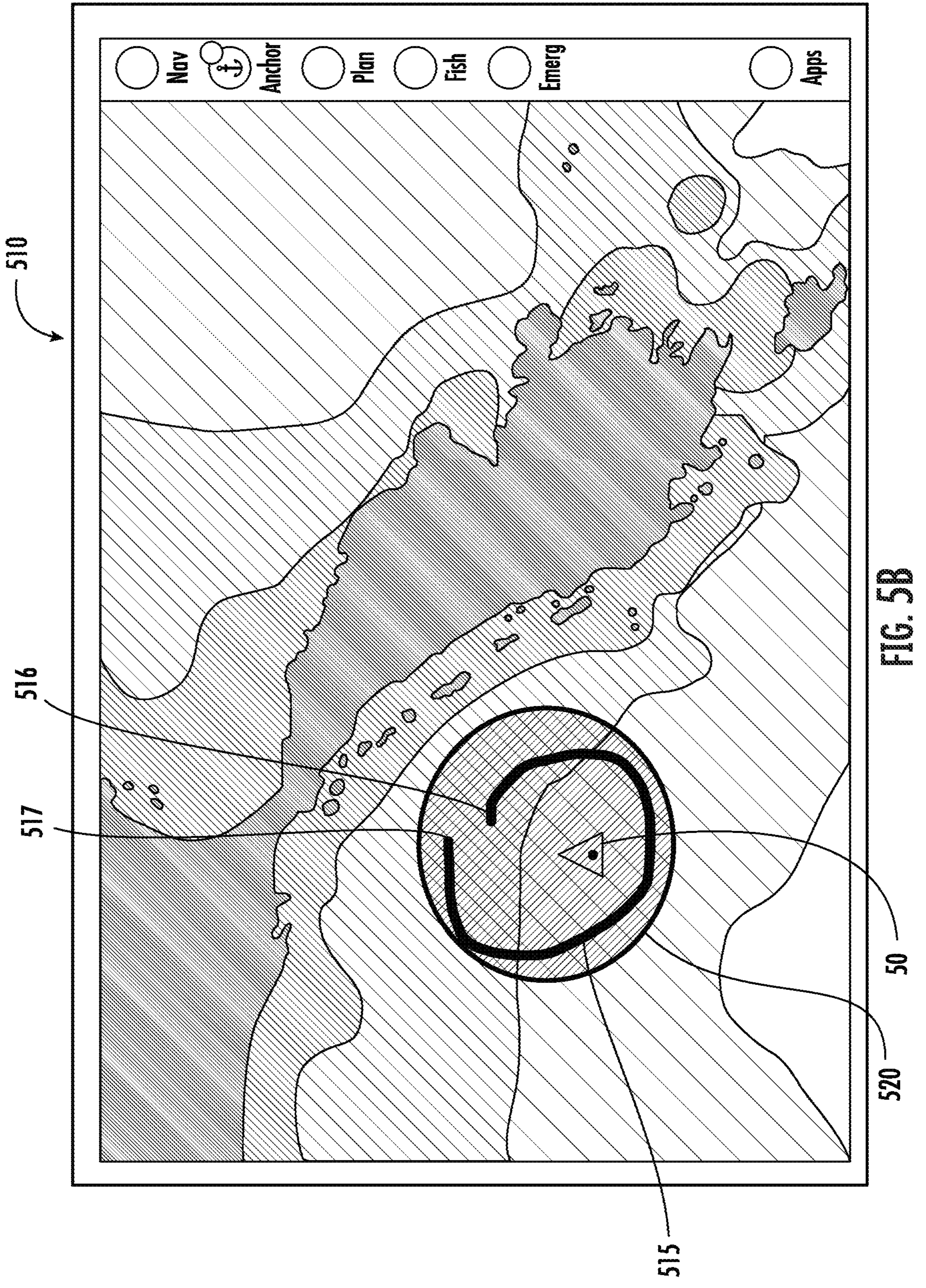
Figure 5C:
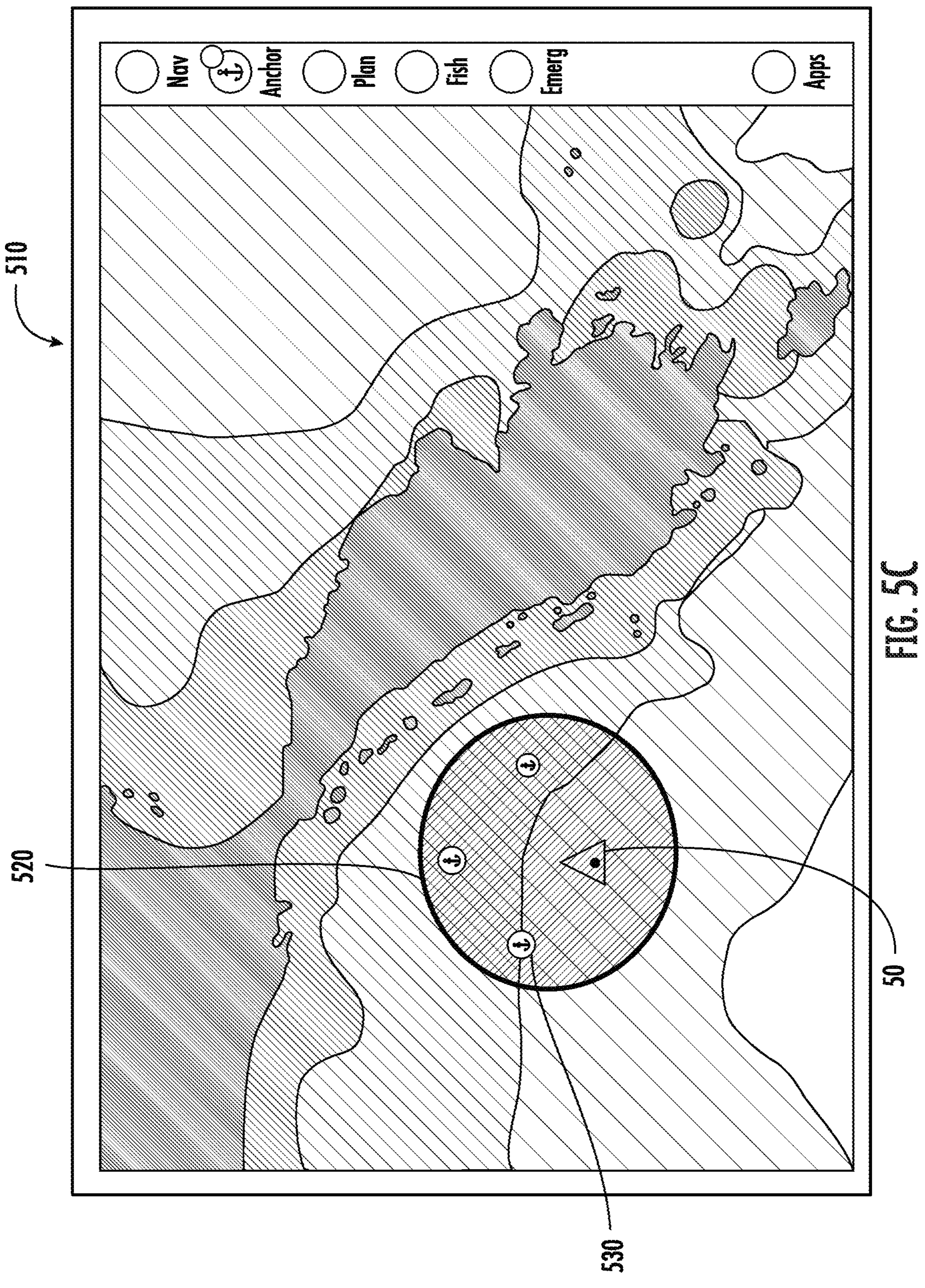
Figure 6A:
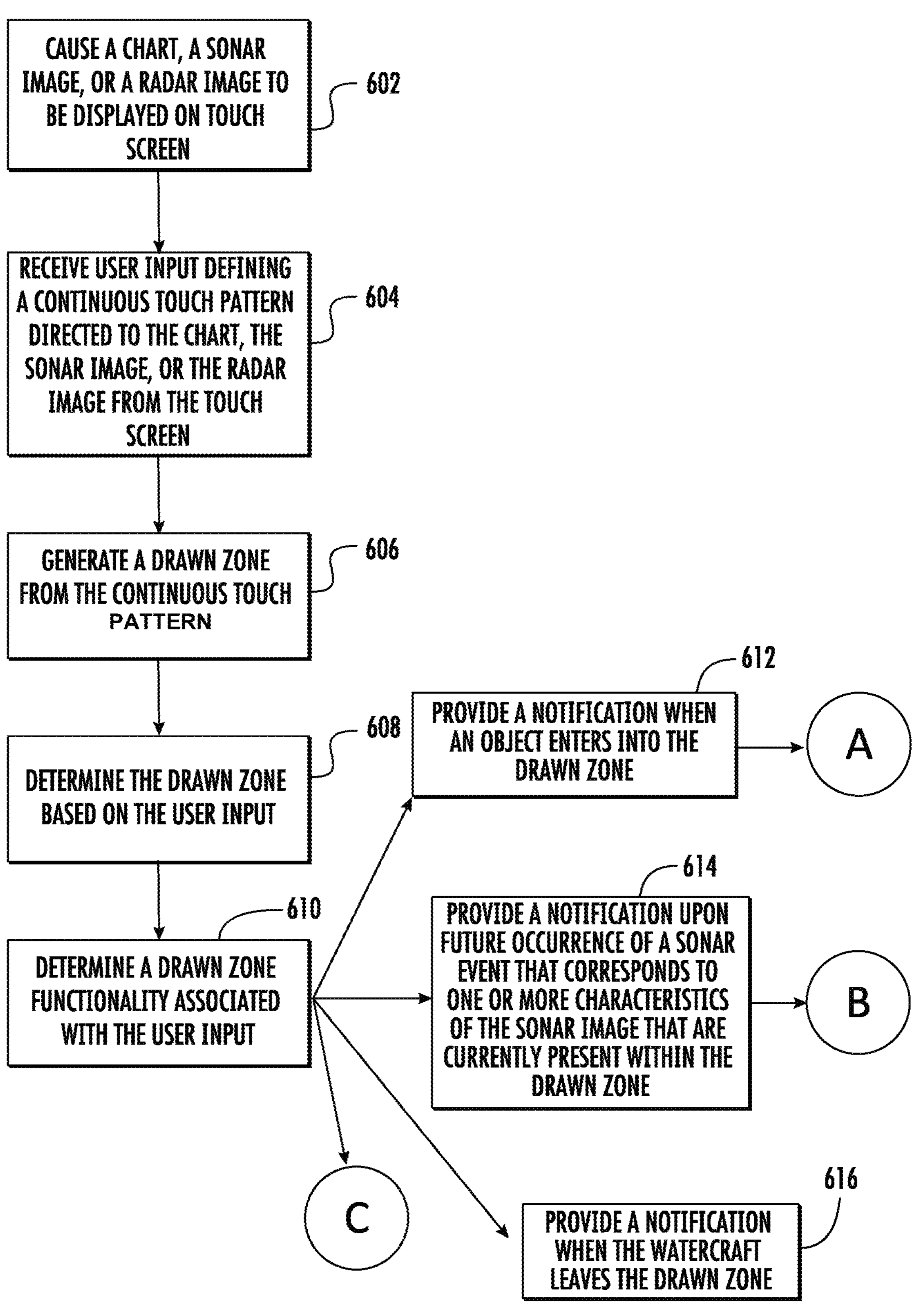
Figure 6B:
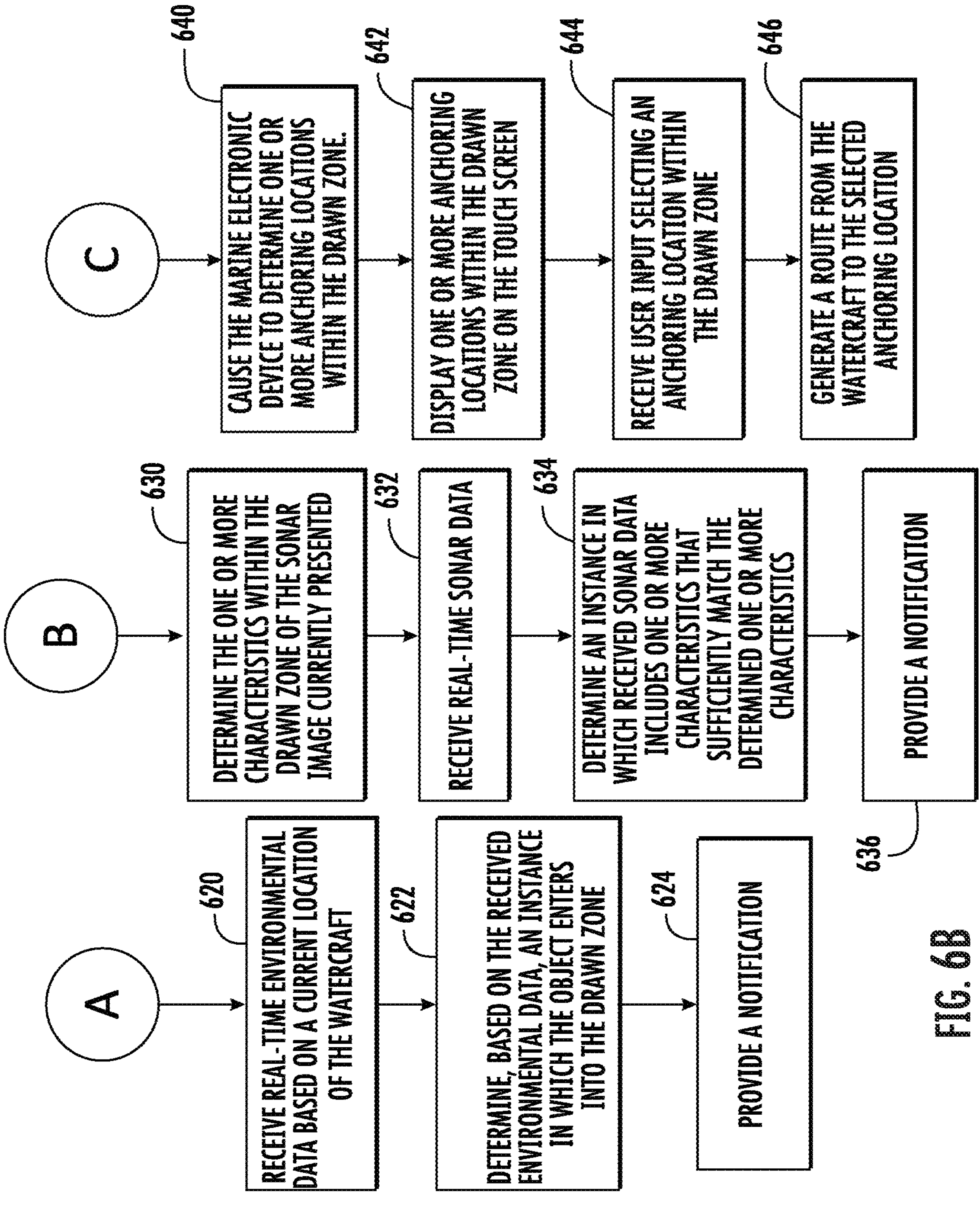
Figure 7:
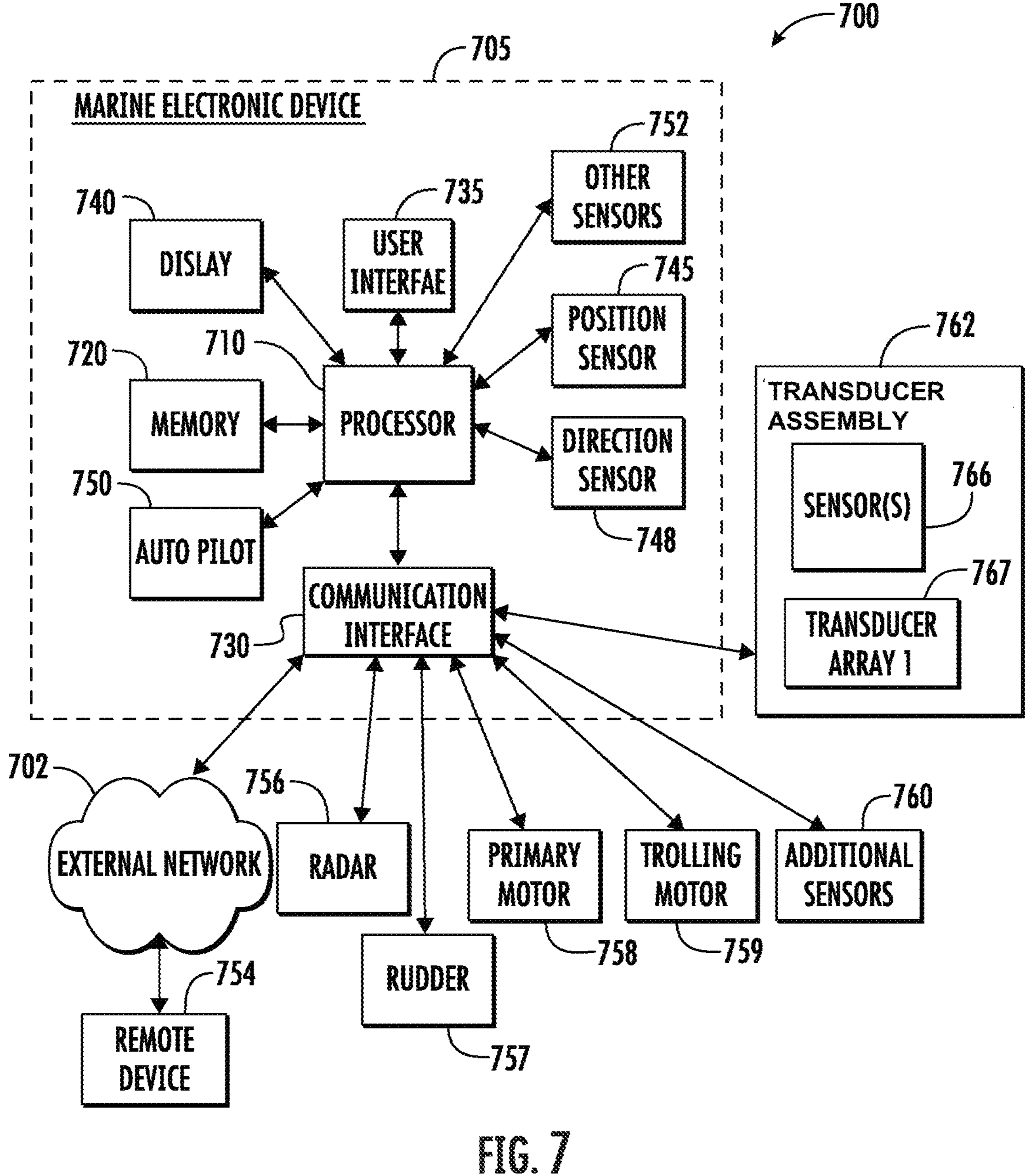

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIGS. 2A-2D illustrate various views of an example user interface displaying a radar image and depicting creation and formation of a drawn zone with corresponding functionality, in accordance with various embodiments discussed herein;

FIGS. 3A-3D illustrate various views of an example user interface displaying a sonar image and depicting creation and formation of a drawn zone with corresponding functionality, in accordance with various embodiments discussed herein;

FIGS. 4A-4C illustrate various views of an example user interface presenting a heat map chart and depicting creation and formation of a drawn zone with corresponding functionality, in accordance with various embodiments discussed herein;

FIGS. 5A-5C illustrate various views of an example user interface presenting a chart and depicting creation and formation of a drawn zone with corresponding functionality, in accordance with various embodiments discussed herein;

FIGS. 6A-6B illustrate flowcharts of example methods for operating a marine electronic device for a watercraft, in accordance with some embodiments discussed herein; and FIG. 7 illustrates a block diagram of an example system with various electronic devices, marine devices, and secondary devices, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals generally refer to like elements throughout.

Example Environment

FIG. 1 illustrates an example watercraft 10 including various marine devices, in accordance with various embodiments discussed herein. As depicted in FIG. 1, the watercraft 10 is configured to traverse a marine environment, e.g., a body of water 11. Notably, the watercraft 10 contemplated herein may be a surface watercraft, submersible watercraft, or any other implementation known to those skilled in the art. An example system 100 for operating the watercraft 10 may include a marine electronic device 110 having a display (e.g., multi-function display (MFD)) at the helm of the watercraft 10, although other places on the watercraft 100 are contemplated. Likewise, additionally or alternatively, a user's mobile device may include functionality for the marine electronic device 110. The system 100 may also include a sonar system 120, a navigation system 130 for determining a current location of the watercraft 10, an anchoring system 140, a radar system 150 and/or one or more other devices (e.g., a propulsion system used for propulsion and/or steering). Additionally, the sonar system 120 may include one or more transducer elements, such as in the form of one or more example arrays 122, configured to transmit sound waves into the body of water 11 reaching a seabed 13, receive sonar returns from the body of water 11, and convert the sonar returns into sonar return data, as explained in greater detail below.

In various embodiments, the watercraft 10 may include a gasoline, diesel, or electric motor as part of the propulsion system. The watercraft 10 may use one or more outboard motors, inboard motors, thrusters, jets, pods, trolling motors, or any other type of marine motor or engine for propulsion. The motors may be operated manually or by autopilot units as part of or in communication with the navigation system 130. An autopilot unit may control the direction and speed of the motor.

The marine electronic device 110 may further include a user interface having a multi-functional display, a processor, a memory, a computer, a marine electronics hub, among others onboard or otherwise associated with the watercraft 10. The marine electronic device 110 may be configured to control operations of one or more marine devices (e.g., sonar system 120, propulsion system, radar system 150, the display, anchoring system 140, navigation system 130, among others). The marine electronic device 110 may be in communication with one or more sensor modules, via wired and/or wireless connections. The sensor module may transmit signals to the controller indicating a detected condition, event, and/or a user input. In some embodiments, the controller may be an assembly or system of multiple processors and/or circuitry distributed across various devices. As such, actions taken by the marine electronic device 110 (e.g., determining, transmitting, receiving, generating, comparing) may each occur on different devices or using multiple components.

Many variations of the system 100 are possible. For example, the system 100 may include or be in communication with one or more marine devices. Non-limiting examples of the one or more marine devices include a propulsion system, engine, steering system, gas-powered or electric trolling motor, outboard motor, inboard motor, sonar system, radar system, fish finder, navigation system, global positioning system (GPS), autopilot, plotter, anchor system, lighting, pumps, electrical power system, radio, audio system, digital switching, displays, temperature control system, fuel system, etc.

Example Radar Image Object Notification System

FIGS. 2A-2D illustrate various views of an example user interface displaying a radar image and depicting creating and formation of a drawn zone and corresponding functionality, in accordance with various embodiments discussed herein. The marine electronic device 110 of FIG. 1 includes a user interface 210 having a touch screen, a processor, and a memory having a computer program code stored therein. The processor, the memory and the computer program code are configured to cause the marine electronic device to display a radar image (formed based on radar data) onto the touch screen of the user interface 210, as well as, in some embodiments, other important information about objects presented within the radar data. The user interface 210 may present information about objects in a readily understandable manner so that users are equipped to make well-informed decisions, and the user interface 210 may help emphasize certain representations of objects and/or distinguish the representations so that the user may quickly and easily interpret the radar image.

Figure 2A:
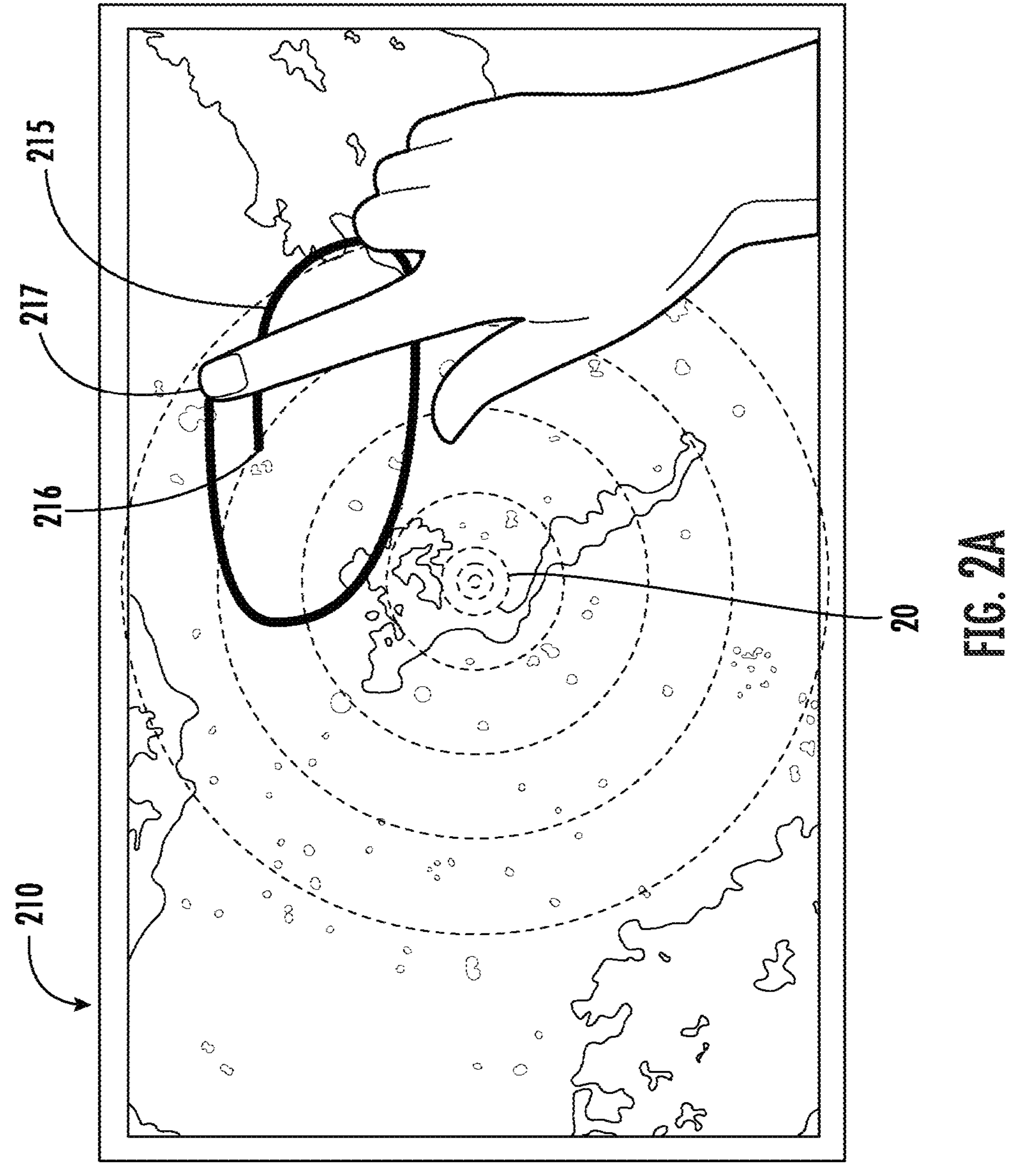

FIG. 2A illustrates an example touch pattern generated based on a user input, depicted by the user's hand. As shown in FIG. 2A and described above, the memory and the computer program code configured thereto, with the processor cause the marine electronic device of a watercraft 20 to display a radar image on the user interface 210. The marine electronic device may then receive, via the touch screen, the user input defining a continuous touch pattern 215 directed to the radar image displayed on the user interface 210. The touch screen may sense a user input defining the continuous touch pattern 215 in reference to the radar image displayed. In some embodiments, the continuous touch pattern 215 may be generated based on movement of the user's finger, as shown in FIG. 2A, a stylus, or the like, across the touch screen. The continuous touch pattern 215 defines a starting point 216, an ending point 217 and a touched line across the touch screen between the starting point 216 and the ending point 217. The touched line defines an at least partially enclosed portion of the radar image displayed on the user interface 210. In certain embodiments, the continuous touch pattern 215 may be of any shape the user prefers, including a circle, a polygon, or any other shape.

Figure 2B:
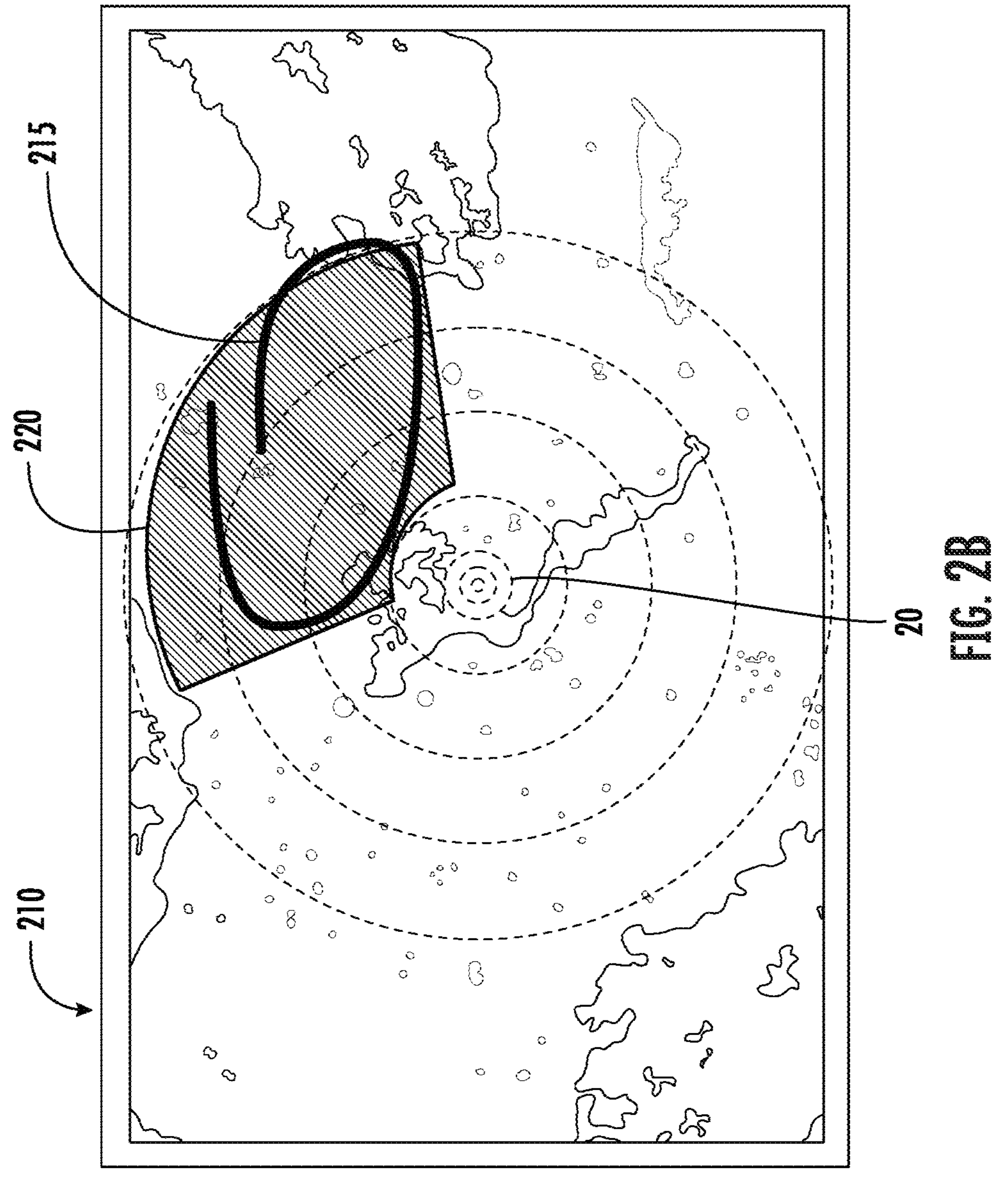

FIG. 2B depicts an example drawn zone 220 generated based on the continuous touch pattern 215 of FIG. 2A. In an example embodiment, the marine electronic device may generate the drawn zone 220 by determining one or more positions on the radar image that each correspond to one or more points on the continuous touch pattern 215. In some embodiments, the marine electronic device may determine a distance between the starting point 216, corresponding to a starting location on the radar data, and the ending point 217, corresponding to an ending location on the radar image, along the touched line. The distance may be the actual distance between the starting location and the ending location, such as nautical miles, feet, meters, or the like. Additionally, or alternatively, the distance may be a relative distance, such as the distance between the starting point 216 and ending point 217 associated with the starting location and ending location, respectively, such as centimeters, inches, or the like. Based on the user input defining the continuous touch pattern 215, the marine electronic device may determine a drawn zone 220 of the radar image, wherein the drawn zone 220 comprises an enclosed portion of the radar image displayed on the user interface 210 that corresponds to the at least partially enclosed portion defined by the touched line of the continuous touch pattern 215.

Figure 2C:
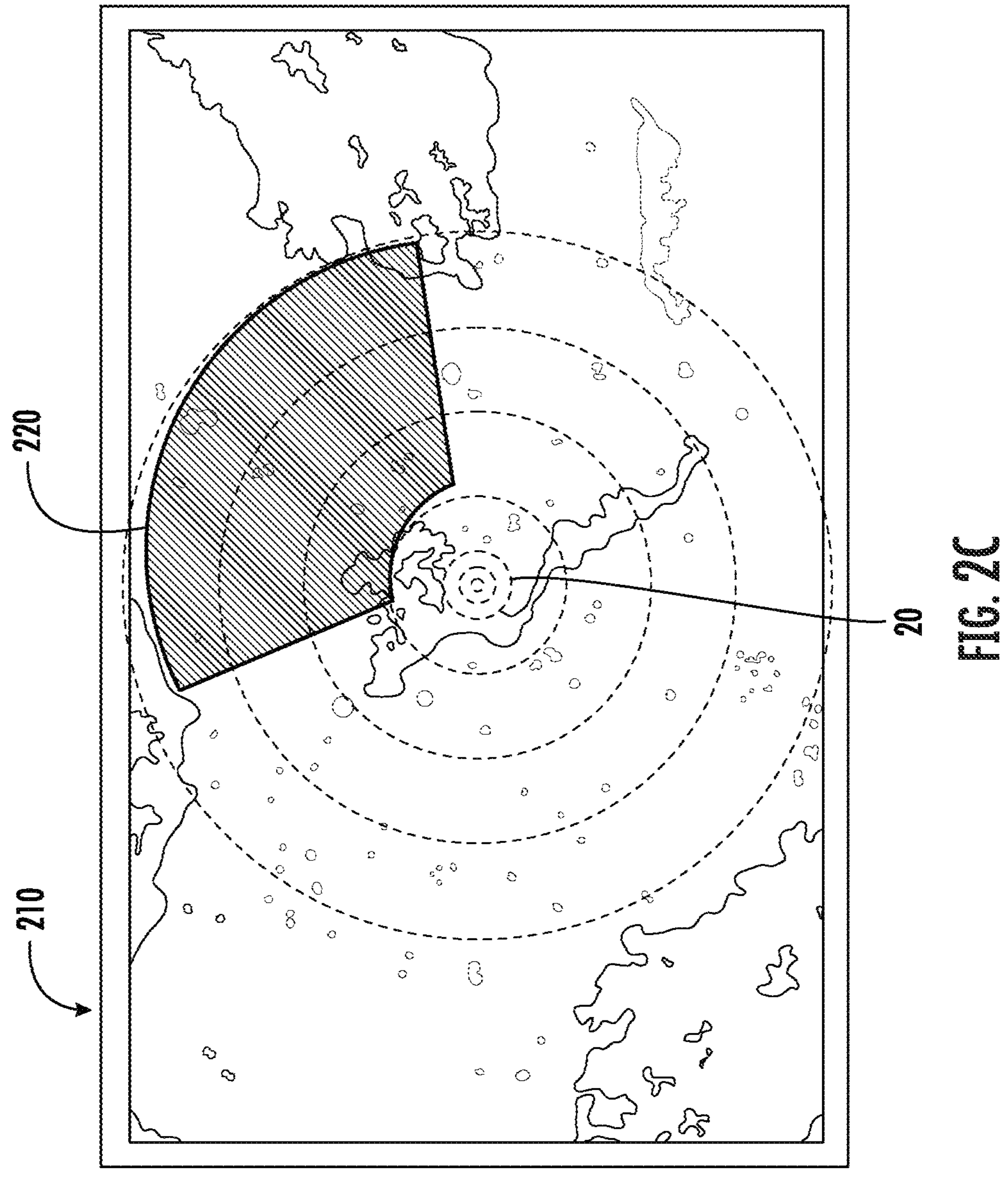
Figure 2D:
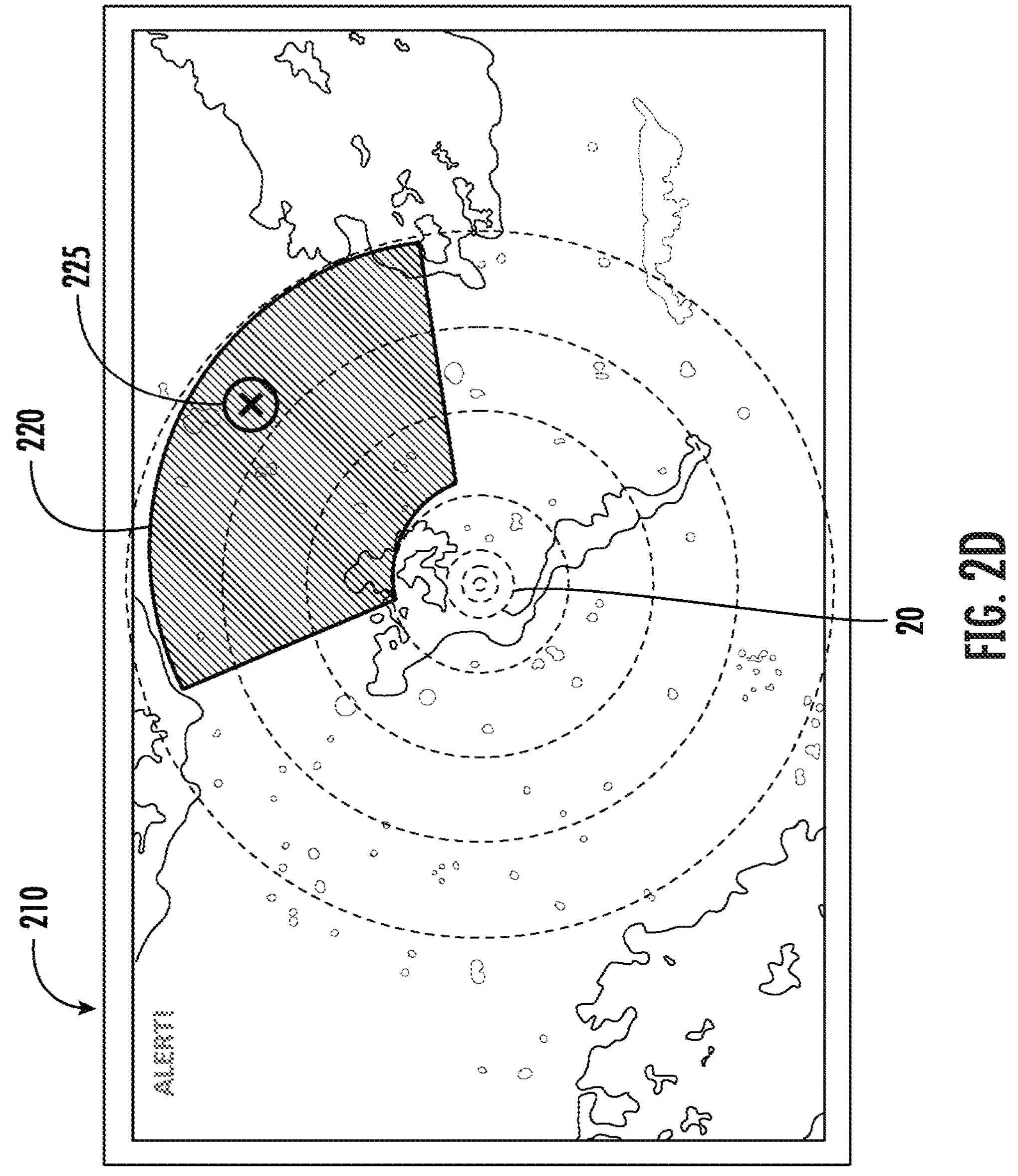

FIG. 2C illustrates an example drawn zone 220 on the user interface 210 generated from the continuous touch pattern 215 created by the user input. In an example embodiment, once the drawn zone 220 is determined, the marine electronic device may determine a drawn zone functionality associated with the user input. As illustrated in FIG. 2D, the drawn zone functionality may cause the marine electronic device to receive real-time environmental data based on a current location of the watercraft 20 and determine, based on the received environmental data, an instance in which an object 225 enters into the drawn zone 220. In response, based on the determined drawn zone functionality, the marine electronic device may operate one or more other systems of the watercraft 20 to provide a notification on the user interface 210 when the object 225 enters into the drawn zone 220. In an example embodiment, the object may be another vessel, a large article floating on the water, a weather pattern, a flock of birds, etc. In an example embodiment, the notification is one or more visual or audio notifications (e.g., an "ALERT" message is displayed over a portion of the radar image). Additionally, in some embodiments, the marine electronic device may further be configured to cause the presentation of the drawn zone 220 on the user interface 210, receive a second user input (including a continuous touch pattern with a starting point, an ending point, and a touched lined) indicating a desired change to the drawn zone 220, and update the drawn zone 220 based on the second user input. Notably, while the described drawn zone functionality includes determining if an object enters the drawn zone, other functionality is contemplated, such as determining when an object leaves the drawn zone, determining any points of interest and/or objects currently present in the drawn zone, etc.

Example Sonar Image Object Notification System

FIGS. 3A-3D illustrate various views of an example user interface displaying a sonar image and depicting creation and formation of a drawn zone and corresponding functionality, in accordance with various embodiments discussed herein. Sonar data is generally obtained from sonar transducer assemblies on a watercraft and is commonly used to form sonar images. As discussed in FIG. 1, a sonar system 120 includes transducer assemblies which may each include one or more transducer elements configured to transmit sound waves into a body of water, receive sonar returns from the body of water, and convert the sonar returns into sonar return data. Various types of sonar transducers may be provided—for example, a linear downscan sonar transducer, a conical downscan sonar transducer, a sonar transducer array, and/or a sidescan sonar transducer may be used. Each of the transducer assemblies are configured to provide sonar data that may be stored and that may undergo further processing to form sonar images. The sonar data may include information representative of an underwater environment around a watercraft, as shown in FIGS. 3A-3D.

Figure 3A:
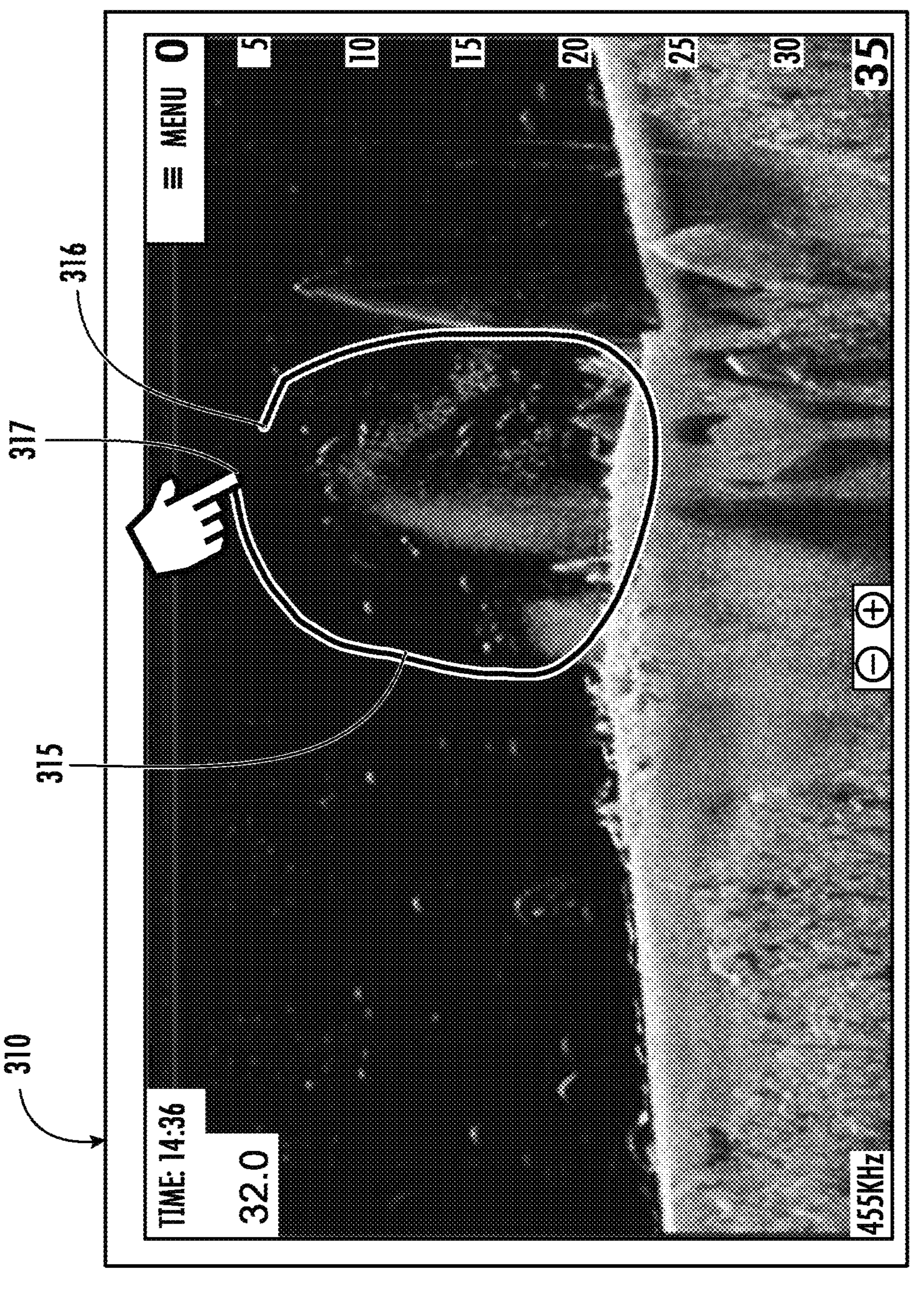

FIG. 3A depicts an example touch pattern generated based on a user input. A marine electronic device 110 for a watercraft of FIG. 1 includes a user interface 310 comprising a touch screen. The marine electronic device further includes a processor and a memory having computer program code stored thereon. As depicted in FIG. 3A, the computer program code is configured to, with the processor, cause the marine electronic device of the watercraft to display a sonar image created by sonar data on the touch screen of the user interface 310, as well as, in some embodiments, other important information about objects presented within the sonar data. The user interface 310 may present information about objects in a readily understandable manner so that users are equipped to make well-informed decisions, and the user interface 310 may help emphasize certain representations of objects and/or distinguish the representations so that the user may quickly and easily interpret the sonar image.

The marine electronic device may then receive, via the touch screen, the user input defining a continuous touch pattern 315 directed to the sonar image displayed on the user interface 310. The touch screen may sense the user input defining the continuous touch pattern 315 in reference to the sonar image displayed. In some embodiments, the continuous touch pattern 315 may be generated based on movement of a user's finger, as shown in FIG. 3A, a stylus, or the like, across the touch screen. The continuous touch pattern 315 defines a starting point 316, an ending point 317 and a touched line across the touch screen between the starting point 316 and the ending point 317. The touched line defines an at least partially enclosed portion of the sonar image displayed on the user interface 310. In certain embodiments, the continuous touch pattern 315 may be of any shape the user prefers, including, for example, a circle, a polygon, or any other shape.

Figure 3B:
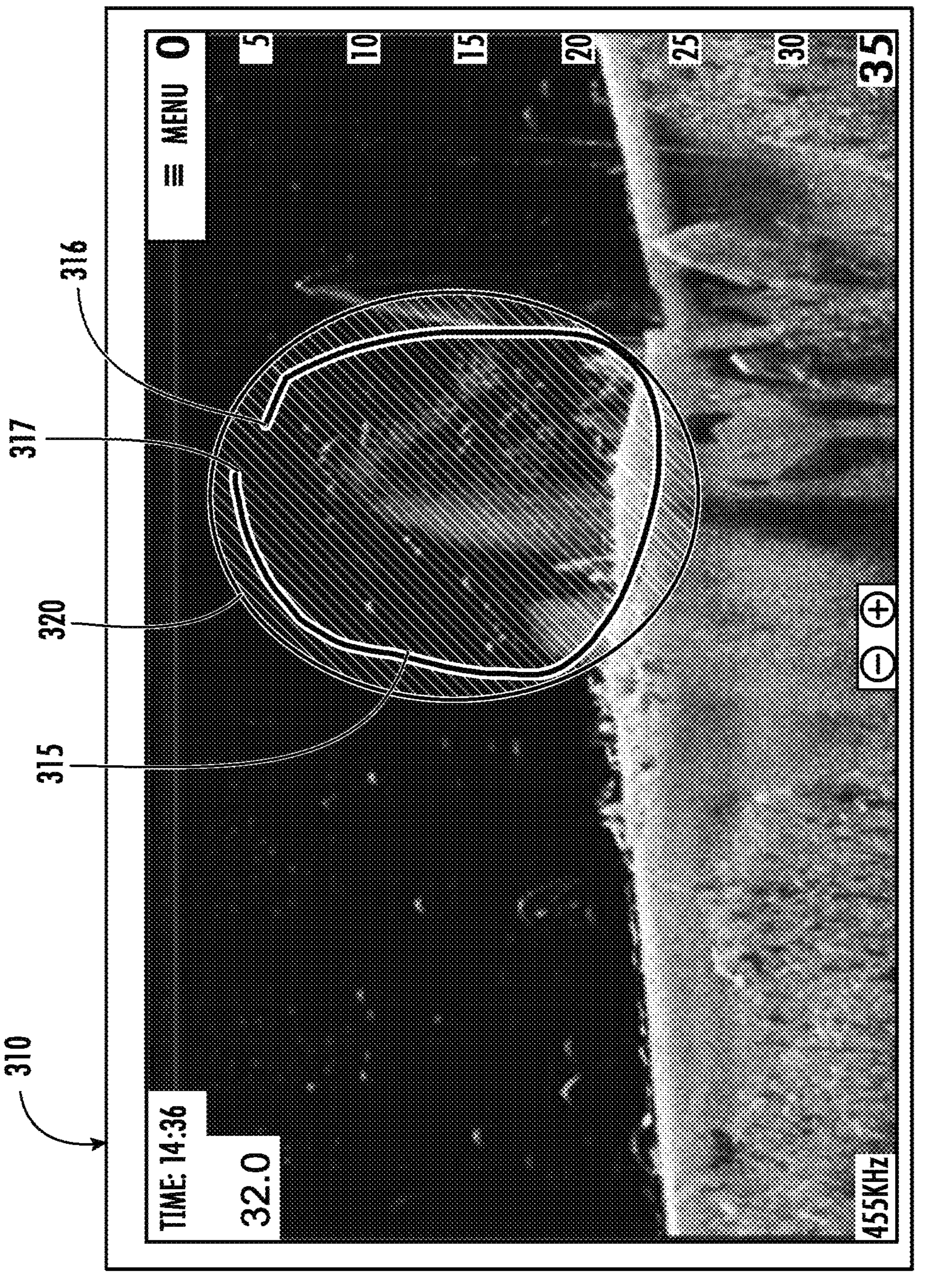

FIG. 3B depicts an example drawn zone 320 generated based on the continuous touch pattern 315 of FIG. 3A. In an example embodiment, the marine electronic device may generate the drawn zone 320 by determining one or more positions (e.g., pixel locations, capacitance sensor-based positions on the screen, etc.) on the sonar image that each correspond to one or more points on the continuous touch pattern 315. In some embodiments, the marine electronic device may determine a touched line between the starting point 316, corresponding to a starting location on the sonar image, and the ending point 317, corresponding to an ending location on the sonar image. Based on the user input defining the continuous touch pattern 315, the marine electronic device may determine a drawn zone 320 of the sonar image. As shown, the drawn zone 320 includes an enclosed portion of the sonar image displayed on the user interface 310 that corresponds to the at least partially enclosed portion defined by the touched line of the continuous touch pattern 315.

Figure 3C:
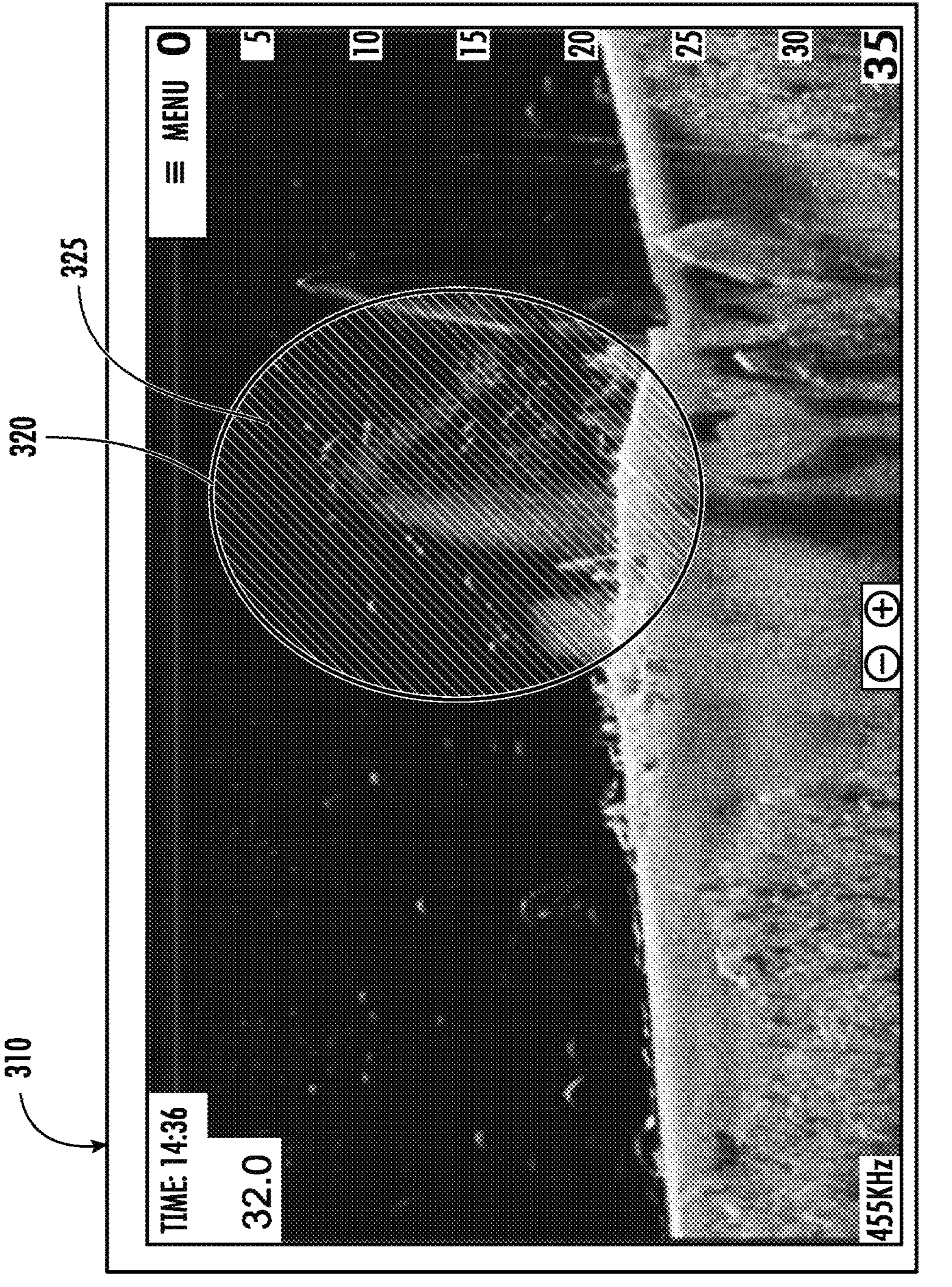
Figure 3D:
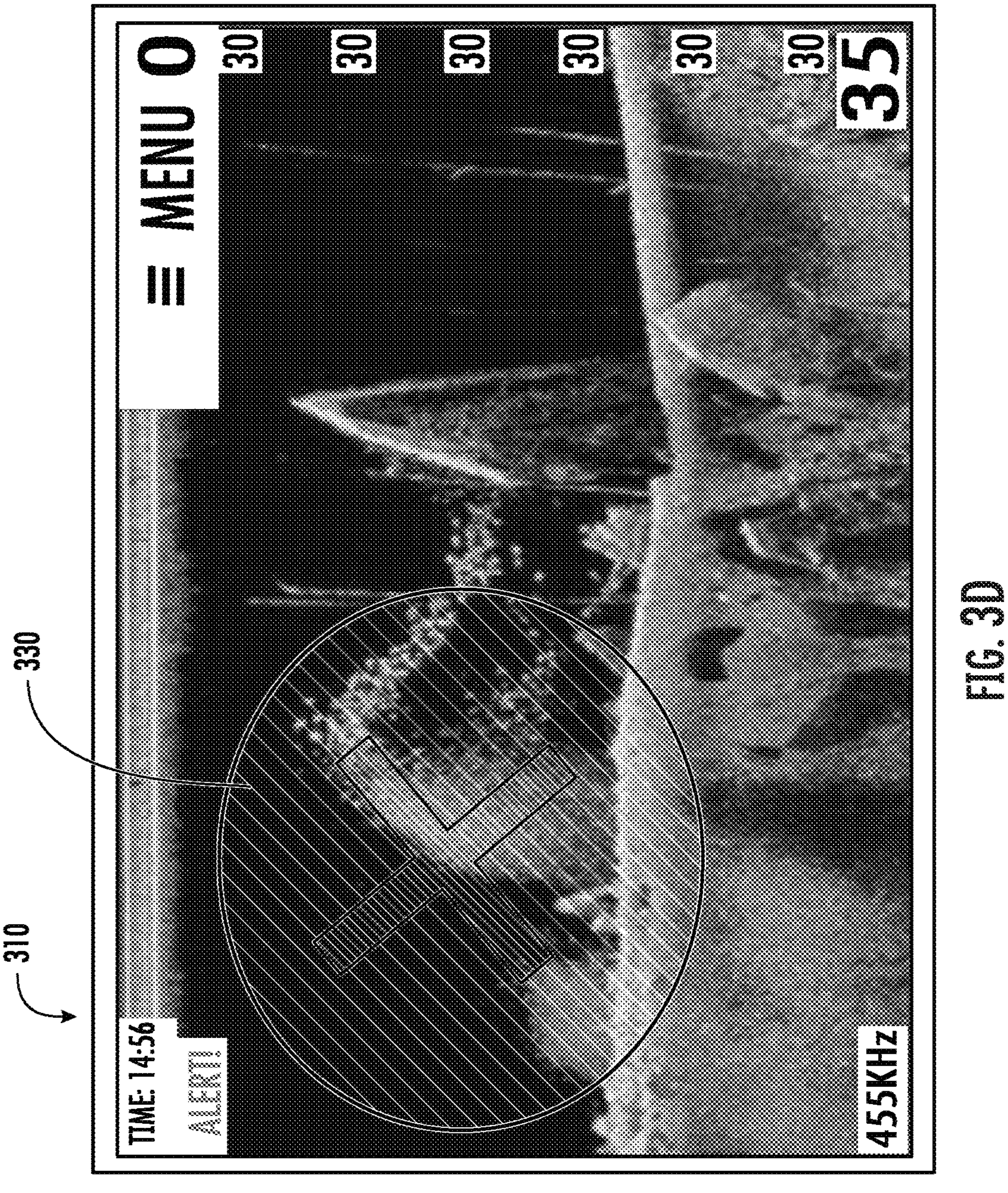

FIG. 3C illustrates an example sonar event 325 within the drawn zone 320 of FIG. 3B. In an example embodiment, once the drawn zone 320 has been determined by the marine electronic device, the device may then determine a drawn zone functionality associated with the user input. One example of the drawn zone functionality, as depicted in FIGS. 3C and 3D, may be for the marine electronic device to provide a notification upon occurrence of a future sonar event 330 that corresponds to one or more characteristics of the current sonar event 325 that is currently present within the drawn zone 320. In certain embodiments, a user may select the sonar event 325 as a school of fish or other waterborne contacts, an underwater wreckage, etc. Once the current sonar event 325 has been selected, the marine electronic device may determine one or more characteristics of the sonar event 325 within the drawn zone 320 of the sonar image currently presented. As shown in FIG. 3D, the marine electronic device may then receive sonar data (or look through past sonar data) and determine an instance in which the received sonar data includes one or more characteristics of the future sonar event 330 that sufficiently match the determined one or more characteristics of the sonar event 325. This may be accomplished, in some embodiments, based on image processing techniques, analyzing the underlying sonar data, and/or other techniques. In some embodiments, machine learning may be applied, such as via artificial intelligence to perform the desired analysis, such as based on historical matches. In response to determining a matching sonar event in the other sonar data, the marine electronic device may provide a notification, such as on the user interface 310, indicating that the sonar event 325 has been identified. This may occur right away, such as along with an indication as to where the match occurred (e.g., at a different position on the chart) and/or could occur at a future time such as when (or near when) the sonar data matching the sonar event has been captured.

In an example embodiment, the notification is one or more visual or audio notifications. Additionally, in some embodiments, the marine electronic device may further be configured to present the drawn zone 320 on the user interface 310, receive a second user input (including the continuous touch pattern with a starting point, an ending point, and a touched lined) indicating a desired change to the drawn zone 320, and update the drawn zone 320 based on the second user input-thereby changing the sonar event 320 that is being watched for.

Example Chart Point of Interest Notification System

FIGS. 4A-4C illustrate various views of an example user interface presenting a heat map chart and depicting a drawn zone functionality, in accordance with various embodiments discussed herein. A heat map may be any data visualization of one or more regions (e.g., with a shape and/or relative positioning) including some visual indication of type or characteristic (e.g., heat) of each region. Notably, while the current example is described in conjunction with a heat map, any chart or map may be utilized—and such example embodiments are not meant to be limited to use with just heat maps. The marine electronic device for a watercraft 40 includes a user interface 410 having a touch screen, a processor, and a memory having a computer program code configured on to the marine electronic device. The processor, the memory and the computer program code are configured to cause the marine electronic device to display a chart created onto the touch screen of the user interface 410, as well as, in some embodiments, other important information about objects presented within the chart. The user interface 410 may present information about objects in a readily understandable manner so that users are equipped to make well-informed decisions, and the user interface 410 may help emphasize certain representations of objects and/or distinguish the representations so that the user may quickly and easily interpret the chart.

FIG. 4A depicts an example touch pattern generated based on a user input. As depicted in FIG. 4A, the memory and the computer program code configured to the memory, with the processor, may cause the marine electronic device of the watercraft 40 to display a chart onto the touch screen of the user interface 410. The marine electronic device may then receive, via the touch screen, the user input defining a continuous touch pattern 415 directed to the chart displayed on to the user interface 410. The touch screen may sense the user input defining the continuous touch pattern 415 in reference to the chart displayed. In some embodiments, the continuous touch pattern 415 may be generated based on movement of a user's finger (as shown in FIG. 4A), a stylus, and the like, across the touch screen. The continuous touch pattern 415 defines a starting point 416, an ending point 417 and a touched line across the touch screen between the starting point 416 and the ending point 417. The touched line defines an at least partially enclosed portion of the chart displayed on the user interface 410. In certain embodiments, the continuous touch pattern 415 may be of any shape the user prefers, including, for example, a circle, a polygon, or any other shape.

FIG. 4B illustrates an example drawn zone 420 generated based on the continuous touch pattern 415 of FIG. 4A. As shown, the drawn zone 420 includes an enclosed portion of the chart displayed on the user interface 410 that corresponds to the at least partially enclosed portion defined by the touched line of the continuous touch pattern 415. In an example embodiment, the marine electronic device may generate the drawn zone 420 by determining one or more positions on the chart that each correspond to one or more points on the continuous touch pattern 415. In some embodiments, the marine electronic device may determine a distance between the starting point 416, corresponding to a starting location on the chart, and the ending point 417, corresponding to an ending location on the chart. The distance may be the actual distance between the starting location and the ending location, such as nautical miles, feet, meters, or the like. Additionally, or alternatively, the distance may be a relative distance, such as the distance between the starting point 416 and ending point 417 associated with the starting location and ending location, respectively, such as centimeters, inches, or the like. Based on the user input defining the continuous touch pattern 415, the marine electronic device may determine the drawn zone 420 associated with the chart.

FIG. 4C illustrates an example drawn zone 420 on the user interface 410 generated from the continuous touch pattern 415 created by the user input. In an example embodiment, once the drawn zone 420 has been determined by the marine electronic device, the device may then determine a drawn zone functionality associated with the user input. As illustrated, in an embodiment, the drawn zone functionality may cause the marine electronic device to receive real-time environmental data based on a current location of the watercraft 40 and determine, based on the received environmental data, an instance in which the watercraft 40 leaves the drawn zone 420. In response, based on the determined drawn zone functionality, the marine electronic device may operate one or more other systems of the watercraft 40 to provide a notification on the user interface 410 when the watercraft 40 leaves the drawn zone 420. In an example embodiment, the notification provided to the user is one or more visual or audio notifications.

Furthermore, in some embodiments, the drawn zone 420 of the chart may have other drawn zone functionalities of interest other than determining an instance in which the watercraft 40 leaves the drawn zone 420 and provide a notification thereto. For example, in some embodiments, the computer program code may cause the marine electronic device to determine a current location of the watercraft 40 and determine, based on the current location, an instance in which the watercraft 40 enters the drawn zone 420 generated by the user input and, in response, provide a notification on the user interface 410 when the watercraft 40 enters the drawn zone 420. In other embodiments, the computer program code may cause the marine electronic device to generate a drawn zone to view objects of interest within the drawn zone. For example, the objects of interest may include anchored vessels within the drawn zone, wreckage within the drawn zone and/or specific waypoint structures within the drawn zone. In still other embodiments, the memory and the computer program code may cause the marine electronic device to generate a drawn zone, based on user input, as a zone of interest and to create a route within the drawn zone for different marine activities like fishing within the zone, or to generally search within the zone.

Additionally, in some embodiments, the marine electronic device may further be configured to cause presentation of the drawn zone 420 on the user interface 410, receive a second user input (including a continuous touch pattern with a starting point, an ending point, and a touched lined) indicating a desired change to the drawn zone 420, and update the drawn zone 420 based on the second user input so that the marine electronic device may notify the user if the watercraft 40 leaves the second drawn zone generated from the second user input.

Example Anchoring Location System

FIGS. 5A-5C illustrate various views of an example user interface presenting a chart and depicting a drawn zone functionality, in accordance with various embodiments discussed herein. In some embodiments, the marine electronic device of a watercraft 50 may provide a user with information regarding where to anchor (e.g., latitudinal and longitudinal coordinates for points and/or regions). For example, the marine electronic device may enable a user to find, create, and/or navigate to anchoring locations based on a user input (e.g., desired anchoring time/activity, information particular to watercraft 50).

FIG. 5A depicts an example touch pattern generated based on a user input. As explained above in FIG. 1, a marine electronic device for a watercraft 50 includes a user interface 510 comprising a touch screen. The marine electronic device further includes a processor and a memory having computer program code stored thereon. As shown, the computer program code is configured to it, with the processor, cause the marine electronic device of the watercraft 50 to display a chart on the touch screen of the user interface 510. The marine electronic device may then receive, via the touch screen, the user input defining a continuous touch pattern 515 directed to the chart displayed on to the user interface 510. The touch screen may sense the user input defining the continuous touch pattern 515 in reference to the chart displayed. In some embodiments, the continuous touch pattern 515 may be generated based on movement of a user's finger (as shown in FIG. 5A), a stylus, and the like, across the touch screen. The continuous touch pattern 515 defines a starting point 516, an ending point 517 and a touched line across the touch screen between the starting point 516 and the ending point 517. The touched line defines an at least partially enclosed portion of the chart displayed on the user interface 510. In certain embodiments, the continuous touch pattern 515 may be of any shape the user prefers, including, for example, a circle, a polygon, or any other shape.

FIG. 5B illustrates an example drawn zone 520 generated based on the continuous touch pattern 515 of FIG. 5A. As shown, the drawn zone 520 comprises an enclosed portion of the chart displayed on the user interface 510 that corresponds to the at least partially enclosed portion defined by the touched line of the continuous touch pattern 515. In an example embodiment, the marine electronic device may generate the drawn zone 520 by determining one or more positions on the chart that each correspond to one or more points on the continuous touch pattern 515. In some embodiments, the marine electronic device may determine a distance between the starting point 516, corresponding to a starting location on the chart, and the ending point 517, corresponding to an ending location on the chart. The distance may be the actual distance between the starting location and the ending location, such as nautical miles, feet, meters, or the like. Additionally, or alternatively, the distance may be a relative distance, such as the distance between the starting point 516 and ending point 517 associated with the starting location and ending location, respectively, such as centimeters, inches, or the like. Based on the user input defining the continuous touch pattern 515, the marine electronic device may determine the drawn zone 520 associated with the chart.

FIG. 5C illustrates an example drawn zone functionality of the drawn zone 520 generated from the continuous touch pattern 515 created by the user input. In an example embodiment, once the drawn zone 520 has been determined by the marine electronic device, the device may then determine a drawn zone functionality associated with the user input. As illustrated, the drawn zone functionality may cause the marine electronic device to determine one or more anchoring locations within the drawn zone 520. The marine electronic device may then display the one or more anchoring locations within the drawn zone on the touch screen. The user may select a desired anchoring location from the one or more anchoring locations displayed within the drawn zone 520. The marine electronic device may then receive the user input selecting an anchoring location from the drawn zone 520 and generate a route from the watercraft 50 to the selected anchoring location.

Additionally, in some embodiments, the marine electronic device may further be configured to cause presentation of the drawn zone 520 on the user interface 510, receive a second user input (including a continuous touch pattern with a starting point, an ending point, and a touched lined) indicating a desired change to the drawn zone 520, and update the drawn zone 520 based on the second user input so that the marine electronic device may display updated one or more anchoring locations based on the updated drawn zone. In some embodiments, the marine electronic device may utilize a number of factors to suggest one or more anchoring locations to a user. In such embodiments, the one or more anchoring locations may include visual indications of an anchorage quality index for each anchoring location. In this way, the user may choose from a number of appropriate and safe anchoring locations based on dynamic data-thereby minimizing required anchoring knowledge or manually applied expertise. In some embodiments, the marine electronic device may also generate indications of other nearby anchored vessels in order to notify the user of potential surface hazards. In some embodiments, the user interface 510 may include visual indications of environmental data (e.g., wind, current) as it relates to probable position of the anchored marine vessel relative to the set anchoring location. For example, if the environmental data indicates wind out of the northeast at 11 m/s, the marine electronic device may use this wind and/or other environmental data to generate visual indications of probable vessel position (e.g., southwest) along the possible swing radius of the anchored vessel.

Anchoring tasks or activities may require the aggregation of several data points and sources of information to successfully identify appropriate anchoring locations that are safe or ideal for anchoring the watercraft 50 securely. In some embodiments, the marine electronic device may include programming that causes the processor to iterate through multiple procedures and/or calculations in determining one or more anchoring locations for the watercraft 50 within the surrounding area (e.g., the set of locations within a region limited by minimum and maximum latitudes and longitudes in four corners set by the zoom level). As a non-limiting example, in order to streamline processing speeds, the marine electronic device may first filter out any non-suitable locations from the drawn zone based on static limits and stored data (e.g., by first ignoring land and removing all regions from the remaining surrounding area with depths greater than a maximum allowable anchoring depth). The marine electronic device may then continue refining the remaining set of locations based on dynamic, real-time, and/or external data. Other methods and procedures are possible.

If the user changes a data input (e.g., anchoring time), the marine electronic device may determine the updated anchoring locations based on the changed data input and update the user interface 510 accordingly. In some embodiments, the marine electronic device may store various possible sets of anchoring locations based on multiple discrete values for certain commonly edited data inputs e.g., anchoring time) in memory, such that the corresponding stored set of anchoring locations may be recalled and rendered in response to the changed data input instead of the processor having to restart the determining procedure. In this way, the user may rapidly change (e.g., "scrub through") editable data inputs and instantly view the resulting scenarios on the user interface 510 without experiencing a lag in rendering. This may advantageously enhance the user's understanding of the anchoring process by providing a dynamic interface from which the user receives seemingly continual feedback.

In some embodiments, the navigation system of the watercraft 50 may include a GPS or other system for determining the location (e.g., latitude and longitude) of the watercraft 50 at any point in time. The user may provide and/or the marine electronic device may detect anchor data (e.g., weight or type) such that the marine electronic device may suggest anchoring locations based on the seabed suitability of the available anchors, for example. Further data inputs may include wind, tide, seabed composition, seabed topography, bow height, scope (ratio), and/or drifting. The data inputs may be static in relation to a particular watercraft (e.g., bow height) or dynamic in relation to the time and location (e.g., wind/weather data) or in relation to user selections (e.g., selected navigation, scope ratio, anchoring time). The data inputs may be appropriately grouped or categorized such that the marine electronic device may generate a dynamic heat map or other informational visualization (e.g., list, chart) of anchoring locations. These data inputs may be user-provided values, previously stored as a boat profile, and/or automatically detected (e.g., via sensors, network data stream).

Example Flowchart(s) and Operations

Embodiments of the present invention provide devices, systems and methods for a watercraft including various marine devices and generating a drawn zone and operating according to drawn zone functionality. Various examples of the operations performed in accordance with embodiments of the present invention will now be provided with reference to FIGS. 6A-6B.

FIGS. 6A-6B illustrate flowcharts according to an example method for operating a marine electronic device for a watercraft according to an example embodiment. The operations illustrated in and described with respect to FIGS. 6A-6B may, for example, be performed by, with the assistance of, and/or under the control of one or more of the processor, memory with computer program code stored thereon, communication interface, user interface, position sensor, radar, sensor(s), rudder, display, and/or autopilot (some such example devices, systems, etc. being illustrated in and described with respect to FIG. 7).

The method may include causing a chart, a sonar image, or a radar image to be displayed on a touch screen at operation 602 and receiving a user input via the touch screen defining a continuous touch pattern directed to the one of the chart, the sonar image or the radar image at operation 604. The continuous touch pattern defines a starting point, an ending point, and a touched line across the touch screen between the starting point and the ending point. Furthermore, the touched line defines an at least partially enclosed portion of the one of the chart, the sonar image, or the radar image.

The method may also include determining a drawn zone, based on the user input, of the one of the chart, the sonar image or the radar image at operation 606, and generating the drawn zone from the continuous touch pattern at operation 608. The drawn zone includes an enclosed portion of the one of the chart, the sonar image, or the radar image that corresponds to the at least partially enclosed portion defined by the touched line. The method may also include determining a drawn zone functionality associated with the user input at operation 610 and operating at least one of the marine electronic device or one or more other systems, such as further discussed with respect to FIG. 7, based on the determined drawn zone functionality. The drawn zone functionality may be, for example, providing a notification when an object enters into the drawn zone at operation 612, or providing a notification upon future occurrence of a sonar event that corresponds to one or more characteristics of the sonar image that are currently present within the drawn zone at operation 614, or providing a notification when the watercraft leaves the drawn zone at operation 616. In some embodiments, the method may include determining a current location of the watercraft and determining, based on the current location, an instance in which the watercraft leaves the drawn zone and, in response thereto, provide the notification of operation 616.

In some embodiments, the method may include additional optional operations and/or the operations described above may be modified or augmented. Some examples of modifications, optional operations, and augmentations are described below, such as the notification is one or more visual or audio notifications. In some example embodiments, the method may include causing the marine electronic device to generate the drawn zone by determining one or more positions on one of the chart, the sonar image, or the radar image that each correspond to one or more points along the continuous touch pattern. In some example embodiments, the drawn zone is determined to be a circle, a polygon, or other shape. In some example embodiments, the method may include causing presentation of the drawn zone on the touch screen, receiving a second user input indicating a desired change to the drawn zone, and updating the drawn zone based on the second user input.

The method may continue to point A (e.g., operation 620) of the flowchart as depicted in FIG. 6B, from operation 612. At operation 620, the method may include receiving real-time environmental data based on a current location of the watercraft. The method may then continue to include determining an instance in which the object enters into the drawn zone, based on the received environmental data, at operation 622 and then providing a notification via a touch screen of the user interface at operation 624.

The method may further continue to point B (e.g., operation 630) of the flowchart as depicted in FIG. 6B, from operation 614. At operation 630, the method may include determining one or more characteristics within the drawn zone of the sonar image that is currently presented on the touch screen of the user interface. The method may then include receiving real-time sonar data at operation 632 and determining an instance in which received sonar data includes one or more characteristics that sufficiently match the determined one or more characteristics of the sonar image that was initially presented at operation 634. The method may then include providing a notification to the user via the touch screen at operation 636 notifying the user of the recurrence of the initial sonar event.

The method may further continue to point C (e.g., operation 640) of the flowchart as depicted in FIG. 6B, from operation 616. At operation 640, the method may include to causing the marine electronic device to determine one or more anchoring locations within the drawn zone. This may be done by causing presentation of the one or more anchoring locations within the drawn zone on the touch screen at operation 642 and receiving user input selecting an anchoring location from among the one or more anchoring locations within the drawn zone at operation 644. The method may then include generating a route from the watercraft to the selected anchoring location at operation 646.

While various methods have been described herein, additional steps may be performed, and/or the described methods may be combined together. Further, unless otherwise indicated, the operations described in the embodiments may be performed in different orders or certain operations may be performed simultaneously.

Example System Architecture

FIG. 7 illustrates a block diagram of an example system 700 of various embodiments of the present invention described herein. This advantageously provides for the use of a wide variety of inputs, and these inputs may be utilized to receive data that may be used to assist in various functionality as described herein.

The illustrated system 700 includes a marine electronic device 705. The system 700 may comprise numerous marine devices. As shown in FIG. 7, a transducer assembly 762, a radar 756, a rudder 757, a primary motor 758, a trolling motor 759, and additional sensors/devices 760 may be provided as marine devices, but other marine devices may also be provided. One or more marine devices may be implemented on the marine electronic device 705 as well. For example, a position sensor 745, a direction sensor 748, an autopilot 750, and other sensors 752 may be provided within the marine electronic device 705. These marine devices can be integrated within the marine electronic device 705, integrated on a watercraft at another location and connected to the marine electronic device 705, and/or the marine devices may be implemented at a remote device 754 in some embodiments. The system 700 may include any number of different systems, modules, or components; each of which may comprise any device or means embodied in either hardware, software, or a combination of hardware and software configured to perform one or more corresponding functions described herein.

The at least one processor 710 may be any means configured to execute various programmed operations or instructions stored in a memory device (e.g., memory 720) such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 710 as described herein. In this regard, the at least one processor 710 may be configured to analyze electrical signals communicated thereto to provide or receive radar data from one or more radar devices and additional (e.g., secondary) data from other sources. For example, the at least one processor 710 may be configured to receive radar data and additional data, determine an expected position, velocity (if any), an object type for an object.

In some embodiments, the at least one processor 710 may be further configured to implement signal processing. In some embodiments, the at least one processor 710 may be configured to perform enhancement features to improve the display characteristics of data or images, collect or process additional data, such as time, temperature, GPS information, waypoint designations, or others, or may filter extraneous data to better analyze the collected data. The at least one processor 710 may further implement notices and alarms, such as those determined or adjusted by a user, to reflect proximity of other vehicles (e.g., watercraft), approaching storms, etc.

In an example embodiment, the memory 720 may include one or more non-transitory storage or memory devices such as, for example, volatile and/or non-volatile memory that may be either fixed or removable. The memory 720 may be configured to store instructions, computer program code, radar data, and additional data such as sonar data, chart data, location/position data in a non-transitory computer readable medium for use, such as by the at least one processor 710 for enabling the marine electronic device 705 to carry out various functions in accordance with example embodiments of the present invention. For example, the memory 720 could be configured to buffer input data for processing by the at least one processor 710. Additionally, or alternatively, the memory 720 could be configured to store instructions for execution by the at least one processor 710.

The communication interface 730 may be configured to enable communication to external systems (e.g., an external network 702). In this manner, the marine electronic device 705 may retrieve stored data from a remote device 754 via the external network 702 in addition to or as an alternative to the onboard memory 720. Additionally, or alternatively, the marine electronic device 705 may transmit or receive data, such as radar signal data, radar return data, radar image data, path data or the like to or from a transducer assembly 762. In some embodiments, the marine electronic device 705 may also be configured to communicate with other devices or systems (such as through the external network 702 or through other communication networks, such as described herein). For example, the marine electronic device 705 may communicate with a propulsion system of the watercraft (e.g., for autopilot control); a remote device (e.g., a user's mobile device, a handheld remote, etc.); or another system.

The communications interface 730 of the marine electronic device 705 may also include one or more communications modules configured to communicate with one another in any of a number of different manners including, for example, via a network. In this regard, the communications interface 730 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or transducer assemblies) may be included in the system 700.

The position sensor 745 may be configured to determine the current position and/or location of the marine electronic device 705 (and/or the watercraft 100). For example, the position sensor 745 may comprise a GPS, bottom contour, inertial navigation system, such as machined electromagnetic sensor (MEMS), a ring laser gyroscope, or other location detection system. Alternatively, or in addition to determining the location of the marine electronic device 705 or the watercraft, the position sensor 745 may also be configured to determine the position and/or orientation of an object outside of the watercraft.

The display 740 (e.g., one or more screens) may be configured to present images and may include or otherwise be in communication with a user interface 735 configured to receive input from a user. The display 740 may be, for example, a conventional LCD (liquid crystal display), a touch screen display, mobile device, or any other suitable display known in the art upon which images may be displayed.

In some embodiments, the display 740 may present one or more sets of data (or images generated from the one or more sets of data). Such data includes chart data, radar data, sonar data, weather data, location data, position data, orientation data, sonar data, or any other type of information relevant to the watercraft. Radar data may be received from radar 756 or from radar devices positioned at other locations, such as remote from the watercraft. Additional data may be received from marine devices such as a sonar transducer assembly 762, a primary motor 758 or an associated sensor, a trolling motor 759 or an associated sensor, an autopilot 750, a rudder 757 or an associated sensor, a position sensor 745, a direction sensor 748, other sensors 752, a remote device 754, onboard memory 720 (e.g., stored chart data, historical data, etc.), or other devices.

In some further embodiments, various sets of data, referred to above, may be superimposed or overlaid onto one another. For example, a route may be applied to (or overlaid onto) a chart (e.g., a map or navigational chart). Additionally, or alternatively, depth information, weather information, radar information, sonar information, or any other navigation system inputs may be applied to one another.

The user interface 735 may include, for example, a keyboard, keypad, function keys, mouse, scrolling device, input/output ports, touch screen, or any other mechanism by which a user may interface with the system.

Although the display 740 of FIG. 7 is shown as being directly connected to the at least one processor 710 and within the marine electronic device 705, the display 740 could alternatively be remote from the at least one processor 710 and/or marine electronic device 705. Likewise, in some embodiments, the position sensor 745 and/or user interface 735 could be remote from the marine electronic device 705.

The marine electronic device 705 may include one or more other sensors/devices 752, such as configured to measure or sense various other conditions. The other sensors/devices 752 may include, for example, an air temperature sensor, a water temperature sensor, a current sensor, a light sensor, a wind sensor, a speed sensor, or the like.

The transducer assembly 762 illustrated in FIG. 7 includes one transducer array 767. In some embodiments, more transducer arrays could be included, or other transducer elements could be included. As indicated herein, the transducer assembly 762 may also include a sonar signal processor or other processor (although not shown) configured to perform various sonar processing. In some embodiments, the processor (e.g., at least one processor 710 in the marine electronic device 705, a controller (or processor portion) in the transducer assembly 762, or a remote controller—or combinations thereof) may be configured to filter sonar return data and/or selectively control transducer elements of the transducer array 767. For example, various processing devices (e.g., a multiplexer, a spectrum analyzer, A-to-D converter, etc.) may be utilized in controlling or filtering sonar return data and/or transmission of sonar signals from the transducer array 767.

The transducer assembly 762 may also include one or more other systems, such as various sensor(s) 766. For example, the transducer assembly 762 may include an orientation sensor, such as gyroscope or other orientation sensor (e.g., accelerometer, MEMS, etc.) that can be configured to determine the relative orientation of the transducer assembly 762 and/or the one or more arrays 767-such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like.

The components presented in FIG. 7 may be rearranged to alter the connections between components. For example, in some embodiments, a marine device outside of the marine electronic device 705, such as the radar 756, may be directly connected to the at least one processor 710 rather than being connected to the communication interface 730. Additionally, sensors and devices implemented within the marine electronic device 705 may be directly connected to the communications interface in some embodiments rather than being directly connected to the at least one processor 710.

Conclusion

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed:

1. A marine electronic device for a watercraft, the marine electronic device comprising:

a user interface comprising a touch screen;

a processor; and a memory having computer program code stored thereon, the memory and the computer program code configured to, with the processor, cause the marine electronic device to:

cause one of a chart, a sonar image, or a radar image to be displayed on the touch screen;

receive, via the touch screen, a user input defining a continuous touch pattern directed to the one of the chart, the sonar image, or the radar image, wherein the touch pattern defines a starting point, an ending point, and a touched line across the touch screen between the starting point and the ending point, wherein the touched line defines an at least partially enclosed portion of the one of the chart, the sonar image, or the radar image;

determine, based on the user input, a drawn zone of the one of the chart, the sonar image, or the radar image, wherein the drawn zone comprises an enclosed portion of the one of the chart, the sonar image, or the radar image that corresponds to the at least partially enclosed portion defined by the touched line;

determine a drawn zone functionality associated with the user input, wherein the drawn zone functionality is at least one of: provide a notification when an object other than the watercraft enters into the drawn zone, provide a notification when the watercraft leaves the drawn zone, or provide a notification upon future occurrence of a sonar event that corresponds to one or more characteristics of the sonar image that are currently present within the drawn zone; and operate at least one of the marine electronic device or one or more other systems of the watercraft based on the determined drawn zone functionality.

2. The marine electronic device of claim 1, wherein the notification is one or more visual or audio notifications.

3. The marine electronic device of claim 1, wherein the memory and the computer program code are further configured to cause the marine electronic device to:

generate the drawn zone by determining one or more positions on the one of the chart, the sonar image, or the radar image that each correspond to one or more points along the continuous touch pattern.

4. The marine electronic device of claim 1, wherein the drawn zone is determined to be a circle, a polygon, or other shape.

5. The marine electronic device of claim 1, wherein the memory and the computer program code are further configured to, with the processor, cause the marine electronic device to:

cause presentation of the drawn zone on the touch screen;

receive a second user input indicating a desired change to the drawn zone; and update the drawn zone based on the second user input.

6. The marine electronic device of claim 1, wherein the memory and the computer program code are further configured to cause the marine electronic device to:

receive real-time environmental data based on a current location of the watercraft; and determine, based on the received environmental data, an instance in which the object enters into the drawn zone and, in response thereto, provide the notification.

7. The marine electronic device of claim 1, wherein the memory and the computer program code are further configured to cause the marine electronic device to:

determine the one or more characteristics within the drawn zone of the sonar image currently presented;

receive real-time sonar data; and determine an instance in which received sonar data includes one or more characteristics that sufficiently match the determined one or more characteristics, and, in response thereto, provide the notification.

8. The marine electronic device of claim 1, wherein the memory and the computer program code are further configured to cause the marine electronic device to:

determine a current location of the watercraft; and determine, based on the current location, an instance in which the watercraft leaves the drawn zone and, in response thereto, provide the notification.

9. The marine electronic device of claim 1, wherein the memory and the computer program code are further configured to cause the marine electronic device to determine one or more anchoring locations within the drawn zone.

10. The marine electronic device of claim 9, wherein the memory and the computer program code are further configured to, with the processor, cause the marine electronic device to:

cause presentation of the one or more anchoring locations within the drawn zone on the touch screen;

receive user input selecting an anchoring location from among the one or more anchoring locations within the drawn zone; and generate a route from the watercraft to the selected anchoring location.

11. The marine electronic device of claim 1, wherein the object comprises another watercraft, floating debris, a weather pattern, or a flock of birds.

12. A system for operating a marine electronic device for a watercraft, the system comprising:

a user interface comprising a touch screen;

a processor; and a memory having computer program code stored thereon, the memory and the computer program code configured to, with the processor, cause the marine electronic device to:

cause one of a chart, a sonar image, or a radar image to be displayed on the touch screen;

receive, via the touch screen, a user input defining a continuous touch pattern directed to the one of the chart, the sonar image, or the radar image, wherein the touch pattern defines a starting point, an ending point, and a touched line across the touch screen between the starting point and the ending point, wherein the touched line defines an at least partially enclosed portion of the one of the chart, the sonar image, or the radar image;

determine, based on the user input, a drawn zone of the one of the chart, the sonar image, or the radar image, wherein the drawn zone comprises an enclosed portion of the one of the chart, the sonar image, or the radar image that corresponds to the at least partially enclosed portion defined by the touched line;

determine a drawn zone functionality associated with the user input, wherein the drawn zone functionality is at least one of: provide a notification when an object other than the watercraft enters into the drawn zone, provide a notification when the watercraft leaves the drawn zone, or provide a notification upon future occurrence of a sonar event that corresponds to one or more characteristics of the sonar image that are currently present within the drawn zone; and operate at least one of the marine electronic device or one or more other systems of the watercraft based on the determined drawn zone functionality.

13. The system of claim 12, wherein the memory and the computer program code are further configured to cause the marine electronic device to:

generate the drawn zone by determining one or more positions on the one of the chart, the sonar image, or the radar image that each correspond to one or more points along the continuous touch pattern.

14. The system of claim 12, wherein the drawn zone is determined to be a circle, a polygon, or other shape.

15. The system of claim 12, wherein the memory and the computer program code are further configured to, with the processor, cause the marine electronic device to:

cause presentation of the drawn zone on the touch screen;

receive a second user input indicating a desired change to the drawn zone; and update the drawn zone based on the second user input.

16. The system of claim 12, wherein the memory and the computer program code are further configured to cause the marine electronic device to:

receive real-time environmental data based on a current location of the watercraft; and determine, based on the received environmental data, an instance in which the object enters into the drawn zone and, in response thereto, provide the notification.

17. The system of claim 12, wherein the memory and the computer program code are further configured to cause the marine electronic device to:

determine the one or more characteristics within the drawn zone of the sonar image currently presented;

receive real-time sonar data; and determine an instance in which received sonar data includes one or more characteristics that sufficiently match the determined one or more characteristics, and, in response thereto, provide the notification.

18. The system of claim 12, wherein the memory and the computer program code are further configured to cause the marine electronic device to:

determine a current location of the watercraft; and determine, based on the current location, an instance in which the watercraft leaves the drawn zone and, in response thereto, provide the notification.

19. The system of claim 12, wherein the memory and the computer program code are further configured to cause the marine electronic device to determine one or more anchoring locations within the drawn zone.

20. The system of claim 19, wherein the memory and the computer program code are further configured to, with the processor, cause the marine electronic device to:

cause presentation of the one or more anchoring locations within the drawn zone on the touch screen;

receive user input selecting an anchoring location from among the one or more anchoring locations within the drawn zone; and generate a route from the watercraft to the selected anchoring location.

21. A method for operating a marine electronic device for a watercraft, the method comprising:

causing one of a chart, a sonar image, or a radar image to be displayed on the touch screen;

receiving, via the touch screen, a user input defining a continuous touch pattern directed to the one of the chart, the sonar image, or the radar image, wherein the touch pattern defines a starting point, an ending point, and a touched line across the touch screen between the starting point and the ending point, wherein the touched line defines an at least partially enclosed portion of the one of the chart, the sonar image, or the radar image;

determining, based on the user input, a drawn zone of the one of the chart, the sonar image, or the radar image, wherein the drawn zone comprises an enclosed portion of the one of the chart, the sonar image, or the radar image that corresponds to the at least partially enclosed portion defined by the touched line;

determining a drawn zone functionality associated with the user input, wherein the drawn zone functionality is at least one of: provide a notification when an object other than the watercraft enters into the drawn zone, provide a notification when the watercraft leaves the drawn zone, or provide a notification upon future occurrence of a sonar event that corresponds to one or more characteristics of the sonar image that are currently present within the drawn zone; and operating at least one of the marine electronic device or one or more other systems of the watercraft based on the determined drawn zone functionality.

* * * * *